US009224069B2

(12) United States Patent
Baba et al.

(10) Patent No.: US 9,224,069 B2
(45) Date of Patent: Dec. 29, 2015

(54) PROGRAM, METHOD AND APPARATUS FOR ACCUMULATING IMAGES THAT HAVE ASSOCIATED TEXT INFORMATION

(71) Applicant: FUJITSU LIMITED, Kawasaki-shi, Kanagawa (JP)

(72) Inventors: Takayuki Baba, Kawasaki (JP); Shugo Nakamura, Yokohama (JP); Masaki Ishihara, Kawasaki (JP); Masahiko Sugimura, Meguro (JP); Susumu Endo, Kawasaki (JP); Yusuke Uehara, Kawasaki (JP); Daiki Masumoto, Kawasaki (JP); Hirohisa Naito, Fuchu (JP); Akira Miyazaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 254 days.

(21) Appl. No.: 13/718,374

(22) Filed: Dec. 18, 2012

(65) Prior Publication Data

US 2013/0188880 A1 Jul. 25, 2013

(30) Foreign Application Priority Data

Jan. 24, 2012 (JP) ................................. 2012-012246

(51) Int. Cl.
G06K 9/60 (2006.01)
G06K 9/62 (2006.01)
G06T 11/60 (2006.01)
G06F 17/30 (2006.01)

(52) U.S. Cl.
CPC ........ *G06K 9/6267* (2013.01); *G06F 17/30256* (2013.01); *G06T 11/60* (2013.01)

(58) Field of Classification Search
None
See application file for complete search history.

(56) References Cited

U.S. PATENT DOCUMENTS

| 6,804,684 | B2 * | 10/2004 | Stubler et al. ........................ 1/1 |
| 2008/0219596 | A1 * | 9/2008 | Shiitani et al. ................ 382/306 |
| 2010/0067750 | A1 | 3/2010 | Matsuo et al. |
| 2011/0211736 | A1 * | 9/2011 | Krupka et al. ................ 382/118 |
| 2011/0317982 | A1 * | 12/2011 | Xu et al. ....................... 386/241 |

FOREIGN PATENT DOCUMENTS

| JP | 8-249467 | | 9/1996 |
| JP | 2004-348553 | | 12/2004 |
| JP | 2009-251667 | A | 10/2009 |
| JP | 2010-72708 | | 4/2010 |
| JP | 2010-245983 | A | 10/2010 |
| JP | 2011-090476 | A | 5/2011 |
| JP | 2011-24321 2 | A | 12/2011 |
| JP | 2011-243212 | A | 12/2011 |

OTHER PUBLICATIONS

Japanese Office Action issued on May 26, 2015, in Japanese Application 2012-012246 (partial English translation provided).

* cited by examiner

*Primary Examiner* — Brian P Werner
(74) *Attorney, Agent, or Firm* — Oblon, McClelland, Maier & Neustadt, L.L.P.

(57) ABSTRACT

A computer-readable recording medium storing a program for causing a computer to execute an image accumulating procedure, the procedure includes: specifying a second image similar to a first image that is associated with text information; displaying the second image in an identifiable manner, and the text information on a display device; and storing the text information associated with image information that is related to the second image, based on instruction information that instructs a use of the text information with respect to the second image.

17 Claims, 18 Drawing Sheets

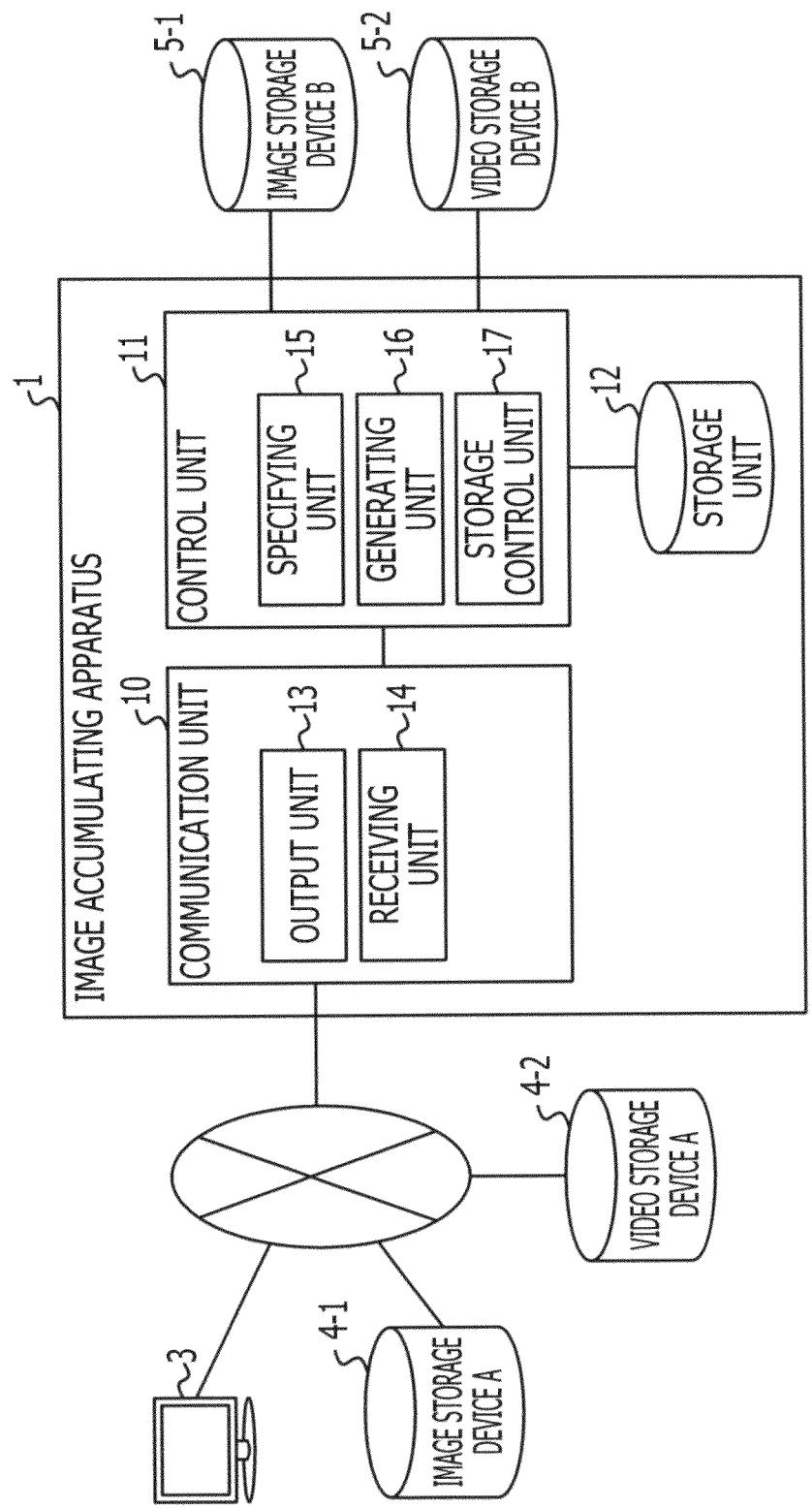

FIG. 2A

| TEXT INFORMATION | IMAGE INFORMATION |
|---|---|
| A | file-001, file-002 |
| B | file-003 |
| ⋮ | ⋮ |
| X | file-001 |

FIG. 2B

| TEXT INFORMATION | IMAGE INFORMATION |
|---|---|
| A | abc\def\g, abc\def\h |
| B | abc\def\l |
| ⋮ | ⋮ |

FIG. 2C

| TEXT INFORMATION | IMAGE INFORMATION | RANGE INFORMATION |
|---|---|---|
| A | abc\def\g | $x_1 \sim x_2, y_1 \sim y_2$ |
| A | abc\def\h | $x_3 \sim x_4, y_3 \sim y_4$ |
| B | abc\def\l | $x_5 \sim x_6, y_5 \sim y_6$ |
| ⋮ | ⋮ | ⋮ |

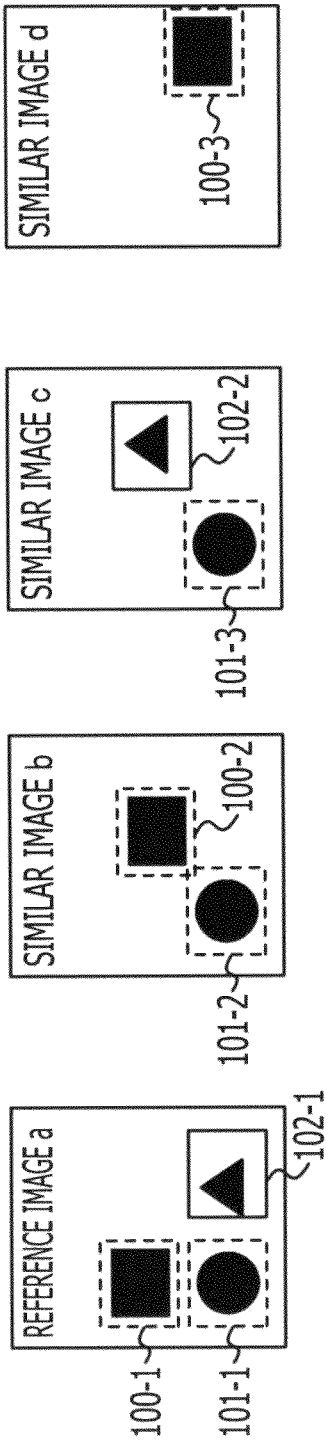

PROGRAM, METHOD AND APPARATUS FOR ACCUMULATING IMAGES THAT HAVE ASSOCIATED TEXT INFORMATION

CROSS-REFERENCE TO RELATED APPLICATION

This application is based upon and claims the benefit of priority of the prior Japanese Patent Application No. 2012-012246, filed on Jan. 24, 2012, the entire contents of which are incorporated herein by reference.

FIELD

The embodiments discussed herein are related to a technique for accumulating images that have associated, as metadata, text information.

BACKGROUND

There are conventional techniques for attaching metadata corresponding to an image characteristic to an image. In relation to an image, metadata is additional data added to the image and is data describing information related to the image. For example, there is a technique for managing video pictures by attaching metadata to a plurality of images making up the video pictures. A metadata editing device described in Japanese Laid-Open Patent Publication No. 2004-348553 detects a change in a scene in a video picture. When comments are inserted in lead images of various scenes by a user, the metadata editing device administers by associating the lead images and the input comments. The comments correspond to metadata.

There is also a technique for identifying an object shown in an image. For example, a face identifying device discussed in Japanese Laid-Open Patent Publication No. 2010-72708 calculates a feature value associated with the face of a specific person from a plurality of images of the specific person. The face identifying device stores the name of the specific person and the calculated feature value. Then, the face identifying device identifies persons shown in an image based on the feature value extracted from that image received as an object for face identification processing and from the previously calculated feature value.

Furthermore, there is technique for searching a plurality of images for images similar to an image specified by a user. For example, the similar image searching device discussed in Japanese Laid-Open Patent Publication No. H08-249467 defines a certain frame image in a video as a reference image and compares point by point another frame image and the reference image. Then, as a result of the comparison, the similar image searching device detects an image with a high correlation to an image belonging to the same cluster as the reference image.

SUMMARY

According to an aspect of the invention, a computer-readable recording medium storing a program for causing a computer to execute an image accumulating procedure, the procedure includes: specifying a second image similar to a first image that is associated with text information; displaying the second image in an identifiable manner, and the text information on the display device; and storing the text information associated with image information that is related to the second image, based on instruction information that instructs a use of the text information with respect to the second image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a functional block diagram of an image accumulating apparatus according to a first embodiment;

FIGS. 2A, 2B and 2C illustrate examples of data tables in a storage unit;

FIGS. 14A and 14B describe a fourth embodiment;

DESCRIPTION OF EMBODIMENTS

Figure 3:
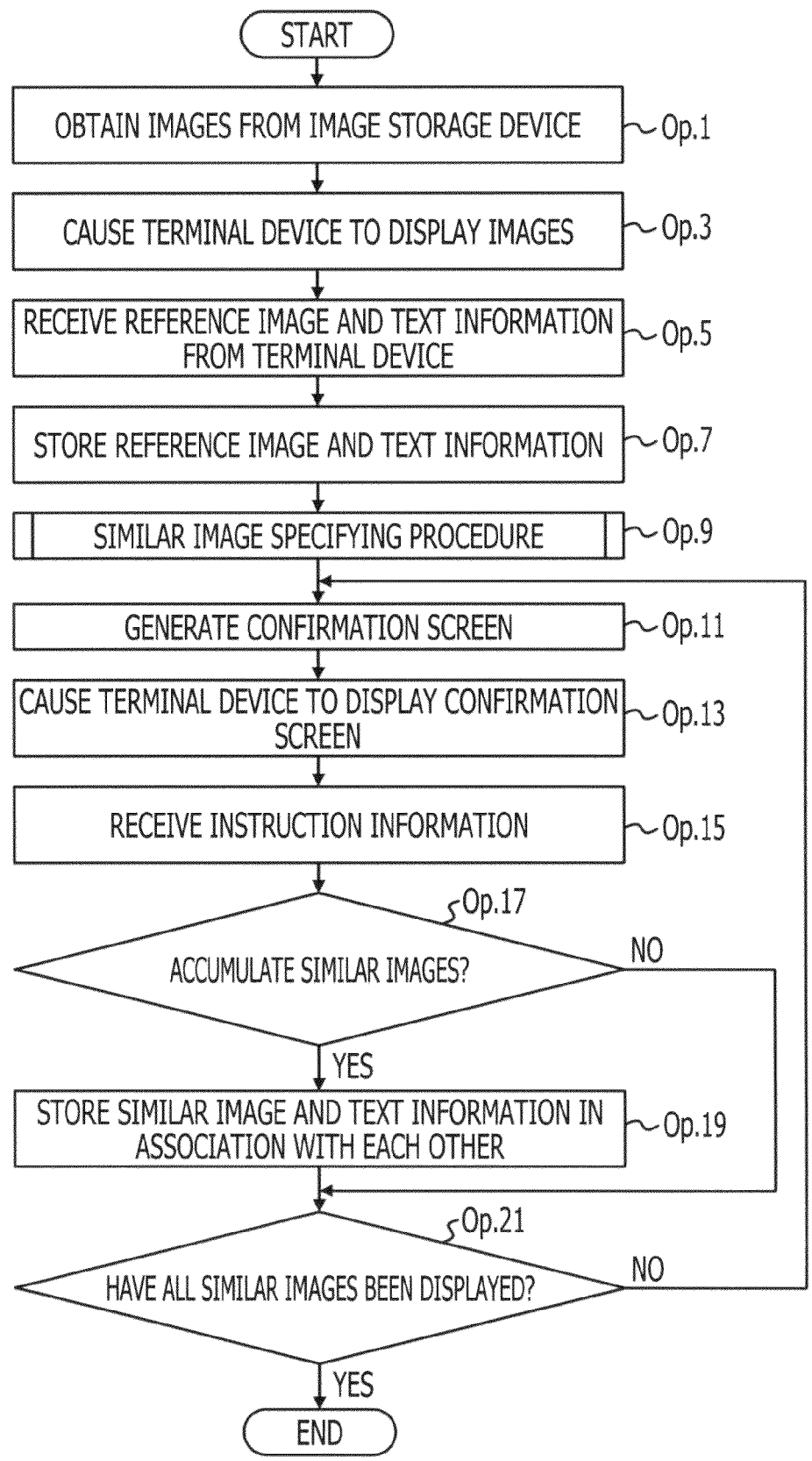
FIG. 3 is a flowchart of an image accumulating procedure according to the first embodiment.

The object identification technique discussed in Japanese Laid-Open Patent Publication No. 2010-72708 involves the preparation of a feature value of an identification target beforehand, and a large amount of images are desirably collected to calculate the feature value. Hereinbelow, the object identification technique refers to feature value each identification target's feature value that is prepared beforehand as a dictionary value.

However, if metadata and images are managed in advance by being associated with each other as in the conventional technique discussed in Japanese Laid-Open Patent Publication No. 2004-348553, target images for calculating the dictionary value may be easily collected. For example, if the metadata is the name of an object shown in an image, an image of the specified object may be effectively extracted from a cluster of accumulated images. A dictionary value associated with the specified object may then be derived by using the extracted image.

In the technique discussed in Japanese Laid-Open Patent Publication No. 2004-348553, a user is expected to perform an operation to attach metadata to a large number of images.

However, by using, for example, the similar image search discussed in Japanese Laid-Open Patent Publication No. 08-249467, it is conceivable to reduce the load of the operation that attaches the metadata to the images. For example, when the user provides, as a reference image, an image of an object that is an identification target, the similar image searching device searches for images similar to the reference image. Then, by attaching, to the similar image, the same object name as the object name of the object shown in the reference image, the object name may be attached as metadata to the reference image and the similar image.

However, similar images similar to the reference image are at most similar, and thus the reference image metadata may possibly not be suitable for the features of the similar images. For example, the same object name may possibly be attached to a retrieved similar image regardless of whether the object shown is different from the object shown in the reference image.

Therefore, it is an object of the embodiments discussed herein to improve the efficiency of operations to attach to an image, as metadata, text information corresponding to a feature of an image, and to accumulate images to which metadata suited to the feature of the image has been attached.

The following describes detailed embodiments of aspects of the present disclosure. The following embodiments may be combined to the extent that the contents of the processing do not contradict. In the embodiments discussed below, text information is attached as metadata to an image. The text information includes the names of states, the names of scenes, and the names of objects and the like shown in an image.

First Embodiment

The first embodiment describes an image accumulating apparatus and an image accumulating method to associate text information with a plurality of images and store the associated text information and images.

FIG. 1 is a functional block diagram of an image accumulating apparatus according to the first embodiment. An image accumulating apparatus 1 communicates with a terminal device 3 through a network. The image accumulating apparatus 1 communicates with an image storage device A4-1 or a video storage device A4-2 through the network. The image accumulating apparatus may communicate directly with an image storage device B5-1 or a video storage device B5-2 without communicating through the network. The network is, for example, a communication network such as the Internet, a cellular network, or a telephone network and the like. The communication network may be a wired network or a wireless network.

The image accumulating apparatus 1 is a computer that associates text information with images and accumulates the text information and the images.

The terminal device 3 is a computer operated by a worker or an administrator who manages the image accumulating apparatus 1. The administrator or worker who operates the terminal device will be referred to as a user in the following explanation.

The image storage device A4-1 is a device that manages images. The image storage device A4-1 stores images that are published on the Internet. There may be one or a plurality of image storage devices A4-1. The video storage device A4-2 is a device for managing videos made up of a plurality of frame images. The video storage device A4-2 stores videos that are published on the Internet. There may be one or a plurality of video storage devices A4-2.

The image storage device B5-1 is a device that manages images. The image storage device B5-1 stores images that are stored by the user. The video storage device B5-2 is a device for managing videos made up of a plurality of frame images. The video storage device B5-2 stores videos that are stored by the user.

The image accumulating apparatus may be able to communicate with at least one of the image storage device A4-1, the video storage device A4-2, the image storage device B5-1, and the video storage device B5-2. Hereinbelow, the image storage device A4-1, the video storage device A4-2, the image storage device B5-1, and the video storage device B5-2 may be referred to collectively as image storage devices unless particular distinction is desired.

The image accumulating apparatus includes a communication unit 10, a control unit 11, and a storage unit 12. The communication unit 10 includes a receiving unit 14 and an output unit 13. The control unit 11 includes a specifying unit 15, a generating unit 16, and a storage control unit 17. The image storage device B5-1 and the video storage device B5-2 may be included in the image accumulating apparatus 1.

The receiving unit 14 is a processing unit that receives information from another device. For example, the receiving unit 14 receives reference images and text information from the terminal device 3. A reference image is an image to which text information has been associated and is an image that is referenced in a similar image specification procedure that is discussed below.

The output unit 13 is a processing unit that outputs information to another device. For example, the output unit 13 outputs screen information to the terminal device 3. The screen information is information related to a screen displayed by the terminal device 3, and is information that is a target of a screen rendering procedure in the terminal device 3.

The specifying unit 15 is a processing unit for specifying a similar image that is similar to a reference image associated with text information. The procedure for specifying a similar image is explained below.

The generating unit 16 is a processing unit for generating screen information. For example, the generating unit 16 generates screen information to cause a similar image specified by the specifying unit 15 to be displayed by the terminal device 3.

The storage control unit 17 is a processing unit that, based on instruction information, associates a similar image and text information and also stores the similar image and the text information in the storage unit 12. The instruction information is information that assures the consistency of the similar image and the text information, and is information that is input as a result of the user confirming the similar image and the text information in the terminal device 3. For example, when the text information is an object name, the instruction information is information that guarantees that an object depicted in a similar image matches an object shown in a reference image.

The storage unit 12 is a storage unit that stores image information as well as text information that is associated with the image information. The image information is identification information for indicating an image file or a location of the image. When the image is a frame image that is part of a video, the image information may be a frame number. For example, the storage unit 12 stores image information related to a similar image and text information associated with the image information under the control of the storage control unit 17.

The terminal device 3 may have the functions of the image accumulating apparatus 1.

FIGS. 2A to 2C illustrate examples of data tables that are stored in a storage unit. The storage unit 12 stores text information and image information in association with each other.

FIG. 2A is a data table for image information when storing image files. In the example illustrated in FIG. 2A, the storage unit 12, under the control of the storage control unit 17, associates text information "A" with image files "file-001" and "file-002". For example, when the text information is an object name, the image of the image file "file-001" is an image that displays an object A.

The image of the image file "file_001" may be an image file of an image of an area portion cut out from an image of another image file. For example, of an image that displays the object A (object name "A") and an object X (object name "X"), an image of the area that displays the object A may be accumulated as the image file "file_001". However, the entire image of the object A (object name "A") and the object X (object name "X") may be accumulated as the image file "file_001".

As illustrated in FIG. 2A, the image accumulating apparatus 1 may be able to save image files, as image information, by storing text information items and image files in association with each other even if the image is erased in an external image storage device.

FIG. 2B illustrates an example of another data table stored in the storage unit 12. FIG. 2B is a data table used when identification information indicating a location of an image is stored as image information. The example in FIG. 2B describes that the image related to the text information "A" is stored at "abc/def/g" and "abc/def/h". For example, a path or an address for each image storage device is stored as the identification information. In particular, with the storage unit 12 storing identification information, the image accumulating apparatus 1 is able to reduce the amount of memory of the storage unit 12 in comparison to when storing an image file.

Furthermore, FIG. 2C illustrates an example of another data table stored in the storage unit 12. FIG. 2C is a data table used when range information is also stored in addition to storing identification information that indicates a location of an image as the image information. Range information is information that indicates an area of an image that is associated with text information. The example of FIG. 2C illustrates that an image associated with the text information "A" may be obtained from "abc/def/g", and furthermore, that an area "x1 to x2" and "y1 to y2" of the image is the area of the image related to the text information "A".

Although the range information in the example in FIG. 2C is described as information having lower-bound coordinates and upper-bound coordinates in both the horizontal and vertical directions, the range information is not limited as such. For example, a plurality of vertex coordinates that form the area may be stored. In the following explanation, the storage unit 12 is described as storing the data table illustrated in FIG. 2A. However, processing may be appropriately modified when using a data table with another configuration.

Next, a procedural flow of an image accumulating procedure will be described with reference to FIG. 3.

The receiving unit 14 obtains a plurality of images from the image storage device (Op. 1). A search condition may be input into the image storage device before Op. 1 and a plurality of images that match the search condition may be obtained. For example, the search condition may be a date and time of when the image was taken, or a keyword or the like that specifies a still image or a video. A title attached to an entire video may be used as the keyword for a video, or a title attached to an entire album that includes a plurality of still images may be used as the keyword for a still image.

The generating unit 16 then generates screen information for the terminal device 3 to render a reference screen. The reference screen is a screen for displaying at least one image among a plurality of images obtained by the image accumulating apparatus 1. A detailed explanation is provided below.

The output unit 13 transmits the reference screen image information to the terminal device 3 to cause the image to be displayed by the terminal device 3 (Op. 3).

The terminal device 3 displays at least one image out of the images received from the image accumulating apparatus 1. The terminal device 3 then receives from the user specification of either a display image or an image that is an area portion of the display image. The specified image or the image that is the specified area portion becomes the reference image. Moreover, the terminal device 3 receives input of text information related to the reference image from the user.

Figure 4:
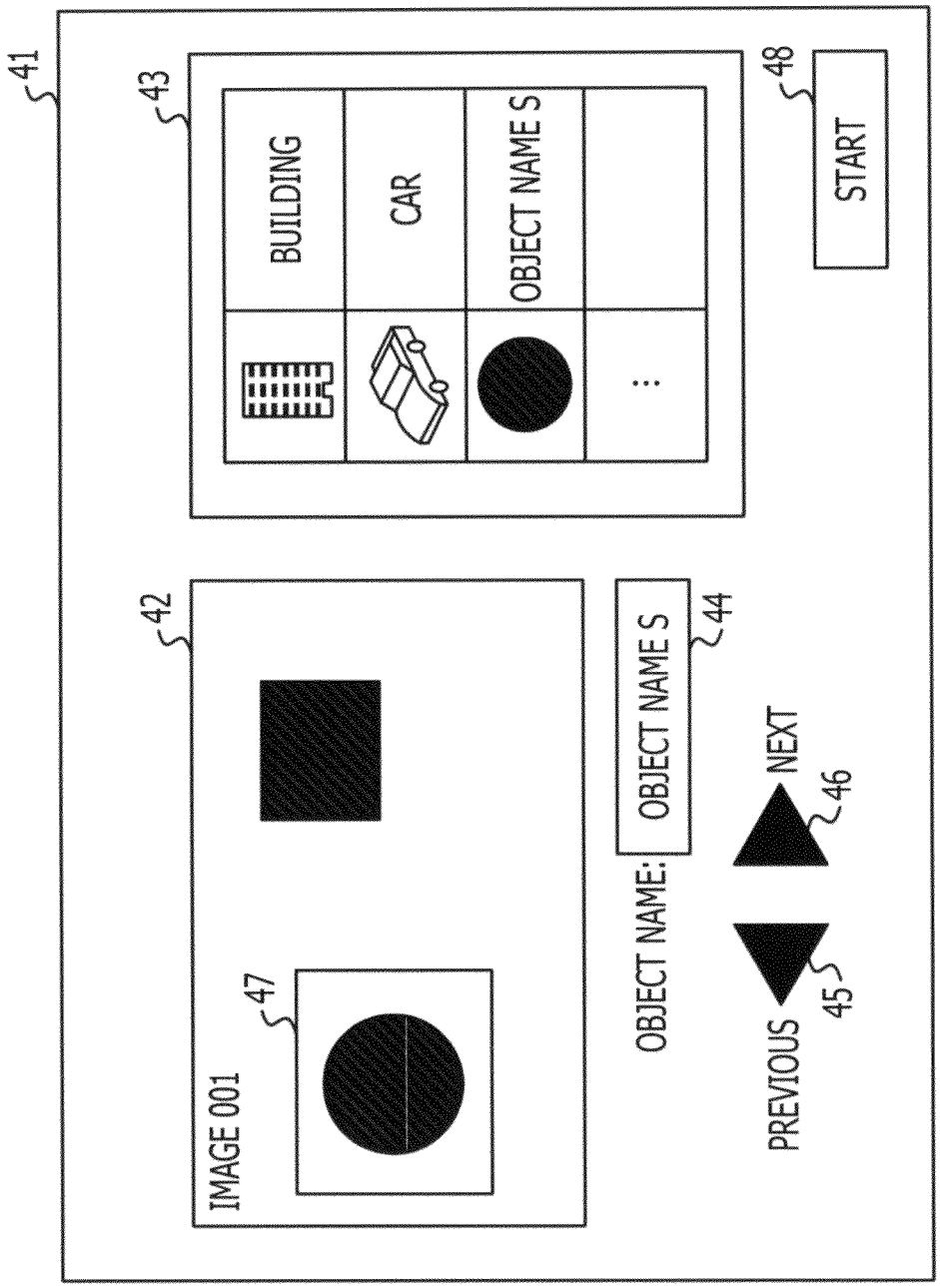
FIG. 4 is a depiction of a reference screen according to the first embodiment.

A reference screen displayed by the terminal device 3 will be described with reference to FIG. 4. FIG. 4 is a depiction of a reference screen. The reference screen is rendered according to image information generated by the generating unit 16. A reference screen 41 has a display area 42, a display area 43, an input area 44, operating buttons 45 and 46, and a start button 48. The reference screen 41 may not include all of these elements. For example, the reference screen 41 may be a screen that includes the display area 42 and the input area 44.

The display area 42 is an area in which an image received from an image accumulating apparatus is displayed. For example, in the example in FIG. 4, an image "001", which depicts a round object and a rectangular object, is displayed. At least a portion of an area of the image displayed in the display area 42 is specified by the user. For example, in the example in FIG. 4, an area 47 that includes the round object is specified by a user operation. Moreover, if a portion of the area is not specified in the display image, the terminal device 3 takes an entire display image as specified.

The display area 43 is an area in which support information, which is for assisting the user while the user is performing an operation to input text information, is displayed. Multiple text information candidates may be displayed as the support information. The support information may also include sample images that correspond to the text information.

For example, when the text information is an object name, the display area 43 displays multiple object names. The user may avoid inputting text information in the input area 44 by selecting one text information item from the multiple text information candidates displayed in the display area 43. Differences in the text information may also be handled by using the support information. Specifically, the possibility that different text information expressions may be input for a certain object may be reduced. The support information may be obtained as a portion of the image information from the image accumulating apparatus 1, or may be obtained from a storage area included in the terminal device 3.

The input area 44 is an area in which text information to be associated with the reference image is input. For example, text information selected from the support information is set in the input area. A character string input by the user may also be set as text information in the input area. When an image previously associated with text information is specified as a reference image, the corresponding text information may also be displayed. FIG. 4 illustrates an example where "object name S" has been input for the reference image of the area 47 that includes the round object.

The operating buttons 45 and 46 are buttons for receiving an instruction from the user to change a display image displayed in a display area to another display image. For example, the display image displayed in the display area 42 may be changed from "image 001" to "image 100" when the operating button 46 is selected via the reference screen.

The starting button 48 is a button for receiving an instruction from the user to transmit the reference image and the text information to the image accumulating apparatus 1. For example, the terminal device 3 transmits the reference image 47 and the text information "object name S" to the image accumulating apparatus 1 when the start button 47 is selected via the reference screen. Specifically, the start button 48 is a button for instructing the image accumulating apparatus 1 to start the similar image specification procedure.

When the start button 48 is operated, the terminal device 3 may transmit the file name of a reference image or the identification information to the image accumulating apparatus 1. Furthermore, the terminal device 3 may also transmit range information to the image accumulating apparatus 1 when the reference image corresponds to an area portion of a certain image.

The explanation now returns to FIG. 3. The receiving unit 14 receives a reference image and the text information from the terminal device 3 (Op. 5). For example, the receiving unit 14 receives the text information "object name S" and the reference image of the area 47 of the image "001" in FIG. 4.

The storage control unit 17 receives the reference image and the text information from the receiving unit 14 and stores the reference image and the text information in the storage unit 12 (Op. 7). If text information that is the same as the received text information is in the storage unit 12, the image file of the reference image is stored in association with the corresponding text information. Conversely, if there is no text information that is the same as the received text information in the storage unit 12, the storage control unit 17 makes a new record in the storage unit 12. The text information and the image file of the reference image are then stored in association with each other in the new record.

The specifying unit 15 specifies a similar image that is similar to the reference image (Op. 9). The processing for specifying a similar image is explained below.

The generating unit 16 generates screen information for a confirmation screen to display the specified similar image (Op. 11). The confirmation screen is a screen for the user of the terminal device 3 to confirm the similar image. Consequently, image information related to the specified similar image and text information corresponding to the reference image received in Op. 5 are included in the screen information. The output unit 13 transmits the confirmation screen image information to the terminal device 3 to thereby display the confirmation screen via the terminal device 3 (Op. 13).

Figure 5:
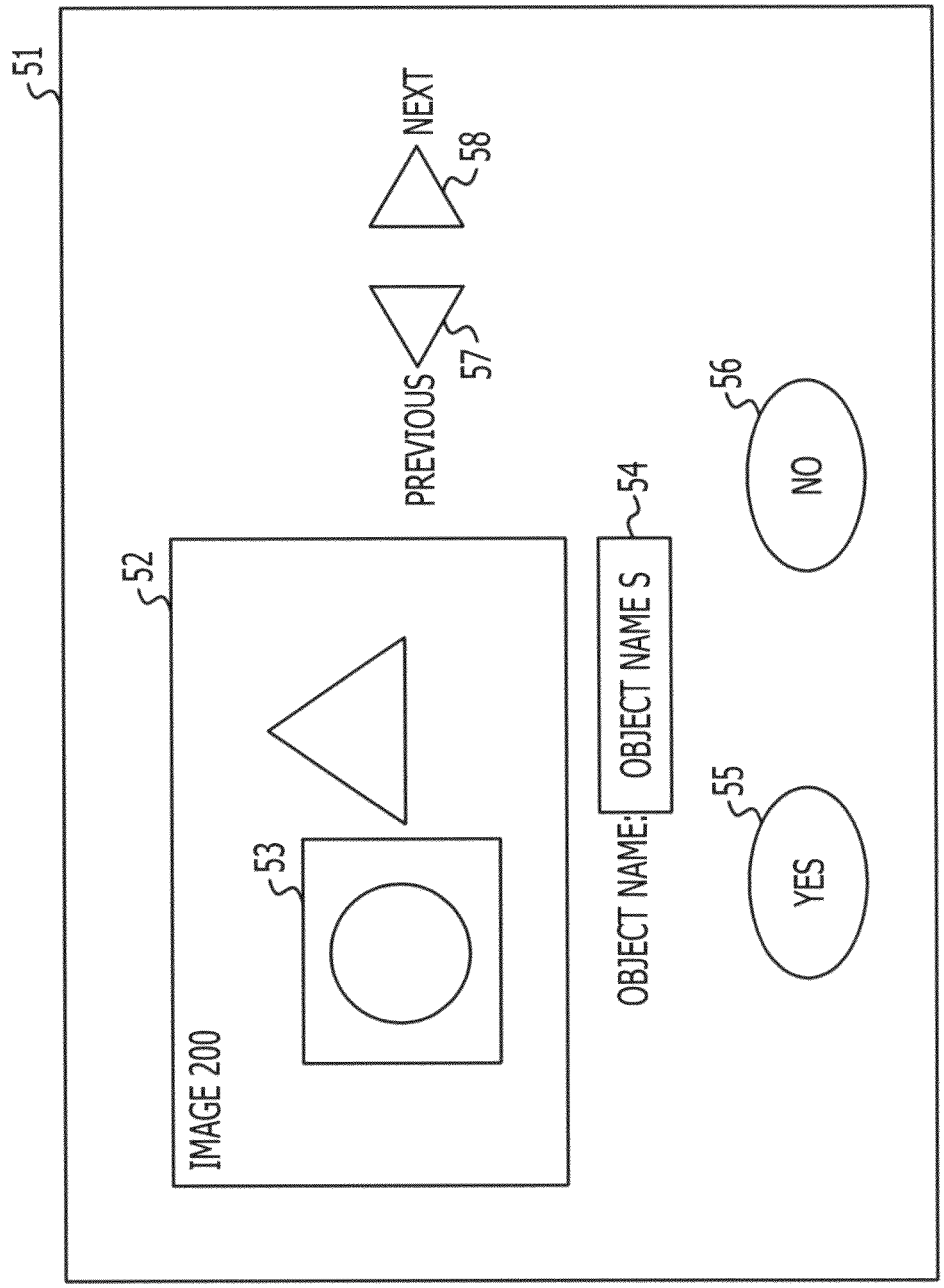
FIG. 5 is a depiction of a confirmation screen according to the first embodiment.

An explanation of the confirmation screen displayed by the terminal device 3 will be provided with reference to FIG. 5. FIG. 5 is a depiction of the confirmation screen. The confirmation screen is rendered by the terminal device 3 based on the screen information generated in Op. 11 by the image accumulating apparatus 1. A confirmation screen 51 includes a display area 52, a display area 54, instruction buttons 55 and 56, and operating buttons 57 and 58. The confirmation screen may possibly not include all of these elements. For example, a screen may include the display area 52 and the display area 54.

The display area 52 displays a similar image specified by the image accumulating apparatus 1. For example, FIG. 5 illustrates an example in which an image depicted in an area 53 is specified as a similar image. An "image 200" that includes the similar image 53 is displayed in the display area 52.

When the similar image is an area portion of a certain image, the user may more easily confirm the similar image when a rectangular area 53 is displayed in the original image. When range information indicating an area of the similar image is included in the image information, a rectangle is displayed around the area corresponding to the range information.

A method besides the rectangle display in FIG. 5 may be used if the method includes a display shape that may identify the area of the similar image. For example, a method such as displaying the area corresponding to the similar image in color while other areas are displayed in monochrome may be used. The user viewing the confirmation screen may enlarge, shrink, or change the shape of the rectangular area 53. The user may change the rectangular area 53 through the use of a mouse or the like.

However, the terminal device 3 may display only the similar image in the display area 53.

The display area 54 is an area in which text information is displayed. Specifically, text information associated with the reference image used when the image accumulating apparatus 1 specifies the similar image is displayed. The user uses the confirmation screen to confirm the similar image displayed in the display area 52 and to confirm the text information displayed in the display area 54. The user is able to confirm the suitability of the text information with regard to the similar image.

The instruction buttons 55 and 56 are buttons for receiving a judgment result from the user regarding the suitability of the text information and the similar image. For example, if the text information is suitable for the similar image, the user selects the instruction button 55 via the confirmation screen. When the instruction button 55 is selected, the terminal device 3 creates instruction information that indicates that the text information and the similar image are suitable. Conversely, when the instruction button 56 is selected via the confirmation screen, the terminal device 3 creates instruction information that indicates that the text information and the similar image are not suitable.

For example, when the text information is an object name and if the name of a displayed object matches an object shown in the similar image, the instruction button 55 is selected. The terminal device 3 may possibly create the instruction information only when the instruction button 55 is selected.

The operating buttons 57 and 58 are buttons for receiving an instruction from the user to change a similar image displayed in the display area 52 to another similar image. For example, when the operating button 58 is selected via the confirmation screen, the image displayed in the display area 52 changes from "image 200" to "image 300." A configuration may be used to switch the display to another similar image when the instruction button 55 or 56 is selected.

The explanation now returns to FIG. 3. The receiving unit 14 receives the instruction information from the terminal device 3 (Op. 15). Specifically, the receiving unit 14 receives instruction information indicating that the text information is suitable with regard to the similar image. The instruction information includes image information of the similar image that is the input target of the instruction information. The similar image that is the input target is the similar image displayed in the display area 52 of the confirmation screen 51. Text information displayed in the display area 54 of the confirmation screen 51 may also be included. The instruction information may also include range information specifying the range of the similar image.

For example, when the instruction button 55 in FIG. 5 is selected, the receiving unit 14 receives instruction information indicating that the text information is suitable for the similar image from the terminal device 3. Conversely, when the instruction button 56 in FIG. 5 is selected, the receiving unit 14 receives instruction information indicating that the text information is not suitable for the similar image from the terminal device 3.

If a configuration is used in which the instruction buttons on the confirmation screen displayed by the terminal device 3 are only operated when the text information is suitable for the similar image, the image accumulating apparatus 1 may advance to Op. 17 when the instruction information is received (Op. 15).

The storage control unit 17 obtains instruction information from the receiving unit 14 and determines whether to accumulate the similar image based on the instruction information (Op. 17). If the instruction information is information that indicates that the text information is suitable for the similar image (Op. 17 YES), the storage control unit 17 associates the similar image with the text information and stores the similar image and the text information in the storage unit 12 (Op. 19). If the instruction information is information that indicates that the text information is not suitable for the similar image (Op. 17 NO), the routine advances to Op. 21.

The generating unit 16 determines whether all the similar images specified in Op. 9 are displayed by the terminal device 3 (Op. 21). If all the similar images are displayed (Op. 21 YES), the processing series is completed. If un-displayed similar images remain (Op. 21 NO), the routine returns to Op. 11. Confirmation screens pertaining to all the similar images may be generated in Op. 11. In this case, Op. 21 may be omitted.

According to the above processing, the image accumulating apparatus 1 is able to specify a similar image that is similar to a reference image. Further, the image accumulating apparatus 1 allows a user to confirm the suitability, with regard to the similar image, of text information associated with a reference image. Specifically, the image accumulating apparatus 1 is able to effectively attach metadata to multiple images.

The image accumulating apparatus 1 is also able to associate and manage the image and metadata after the consistency of the metadata and the image is guaranteed. In particular, when an image with incorrect metadata is included among images with metadata collected to calculate a dictionary value, the reliability of a dictionary value derived from the collected images is reduced. Thus, associating and managing an image and metadata after the consistency of the metadata and the image is guaranteed is advantageous.

The text information may be associated with the similar image and accumulated in the storage unit 12 only when the text information is suitable with regard to the similar image. The image accumulating apparatus 1 is also able to allow the display of a confirmation screen in which the user of the terminal device 3 may easily confirm a similar image. Moreover, the user is able to associate text information corresponding to a reference image with a similar image without inputting text information with respect to the similar image again.

Figure 6:
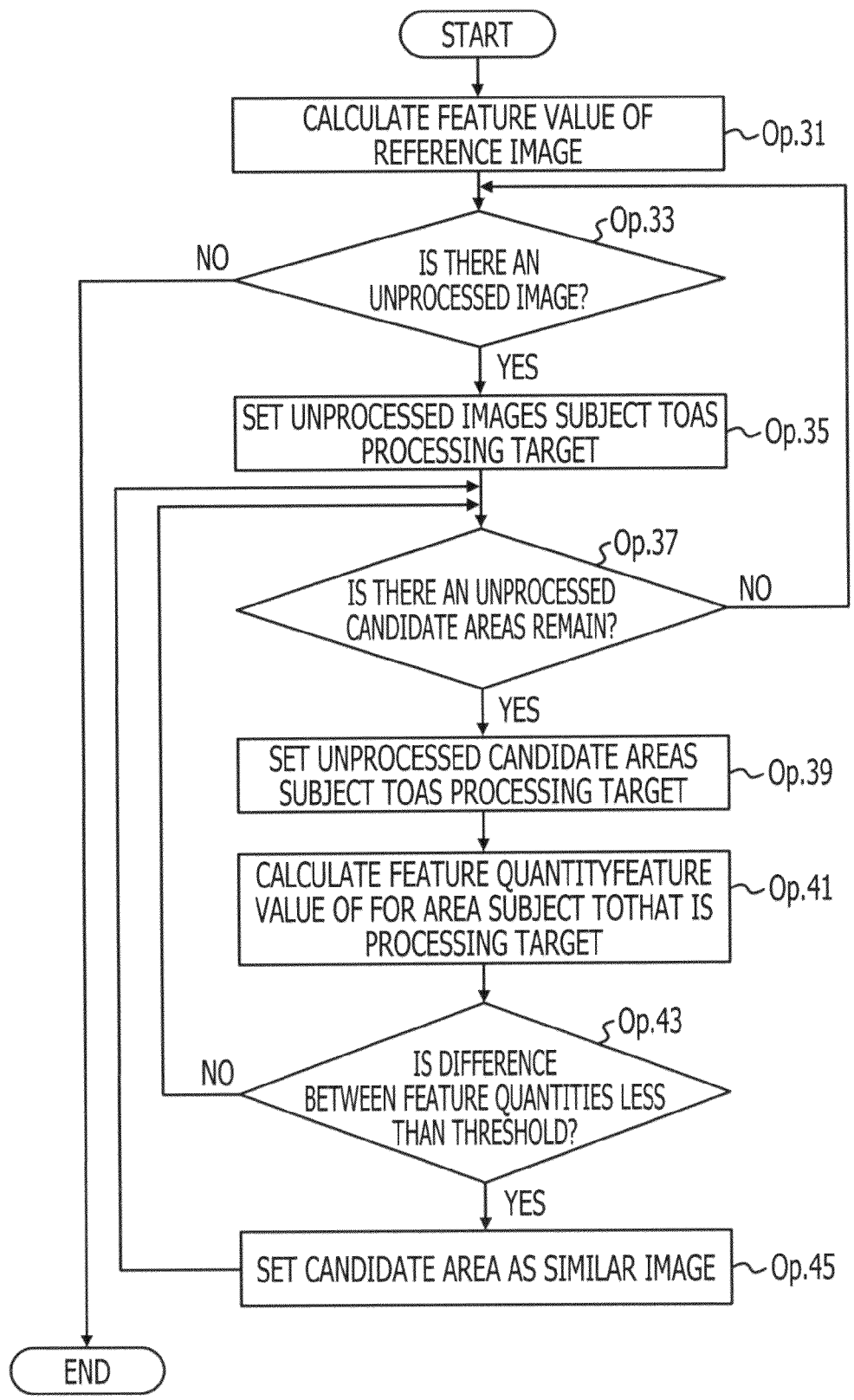
FIG. 6 is a flowchart of a similar image specification procedure according to the first embodiment.

The similar image specification procedure (Op. 9) in FIG. 3 will be described below with reference to FIG. 6. FIG. 6 illustrates a process flow of the similar image specification procedure.

The specifying unit 15 calculates a feature value of the reference image received in Op. 5 (Op. 31). The feature value may use, for example, a color histogram feature value. For example, an HSI histogram feature value may be used as the color histogram feature value. The specifying unit 15 converts each image pixel value of the reference image to HSI color coordinates. The specifying unit 15 divides an HSI space into a lattice and calculates the number of pixels included in each block. The specifying unit 15 further calculates the HSI histogram feature value by converting the calculated results to enumerated vectors. The feature value may be a feature value related to shapes such as a wavelet feature value instead of a color histogram feature value. Moreover, two or more types of feature values may be added and a composite feature value may be used.

Next, the specifying unit 15 determines if there is an unprocessed image that has not been subject to the similar image specification procedure among the images obtained in Op. 1 (Op. 33).

If there is an unprocessed image (Op. 33 YES), the specifying unit 15 sets the unprocessed image as a processing target (Op. 35). The specifying unit 15 determines whether there is an unprocessed candidate area in the image that is a processing target (Op. 37). The candidate area is described below with reference to FIG. 7.

If an unprocessed candidate area exists (Op. 37 YES), the unprocessed candidate area becomes a processing target (Op. 39). The specifying unit 15 calculates a feature value of an image in the candidate area processing target (Op. 41).

The specifying unit 15 calculates a difference between the feature value of the reference image and the feature value of the image in the candidate area, and compares the difference to a threshold (Op. 43). A conventional method may be used to compare the feature value calculations. For example, if the feature value is expressed as a vector shape, the specifying unit 15 sums the differences of the value for each dimension. The smaller the sum, the higher the similarity of the reference image and the candidate area image.

If the difference is less than the threshold (Op. 43 YES), the specifying unit 15 considers the image in the candidate area that is a processing target as a similar image (Op. 45). The specifying unit 15 temporarily stores the similar image in a memory. The specifying unit 15 also stores the range information of the candidate area specified as the similar image therewith. For example, the specifying unit 15 temporarily stores coordinates of the candidate area that is a processing target in Op. 35 as the range information in a memory (not illustrated).

Next, the routine of the specifying unit 15 returns to Op. 37. Additionally, if the difference of the feature values is greater than or equal to the threshold, the processing returns to Op. 37.

If the specifying unit 15 determines in Op. 37 that the processing for all the areas of the images processing target is completed (Op. 37 NO), the routine returns to Op. 33. If the specifying unit 15 determines in Op. 33 that there are no unprocessed images (Op. 33 NO), the similar image specification procedure is completed.

In Op. 43 of FIG. 6, the image in the candidate area when the difference of the feature value is greater than or equal to the threshold is specified as a similar image. However, the processing is not limited to this. For example, after processing all the images in all the candidate areas, the specifying unit 15 may specify as similar images, or otherwise process, a certain number of images in candidate areas starting with those whose difference between the feature value and the threshold is small.

Figure 7:
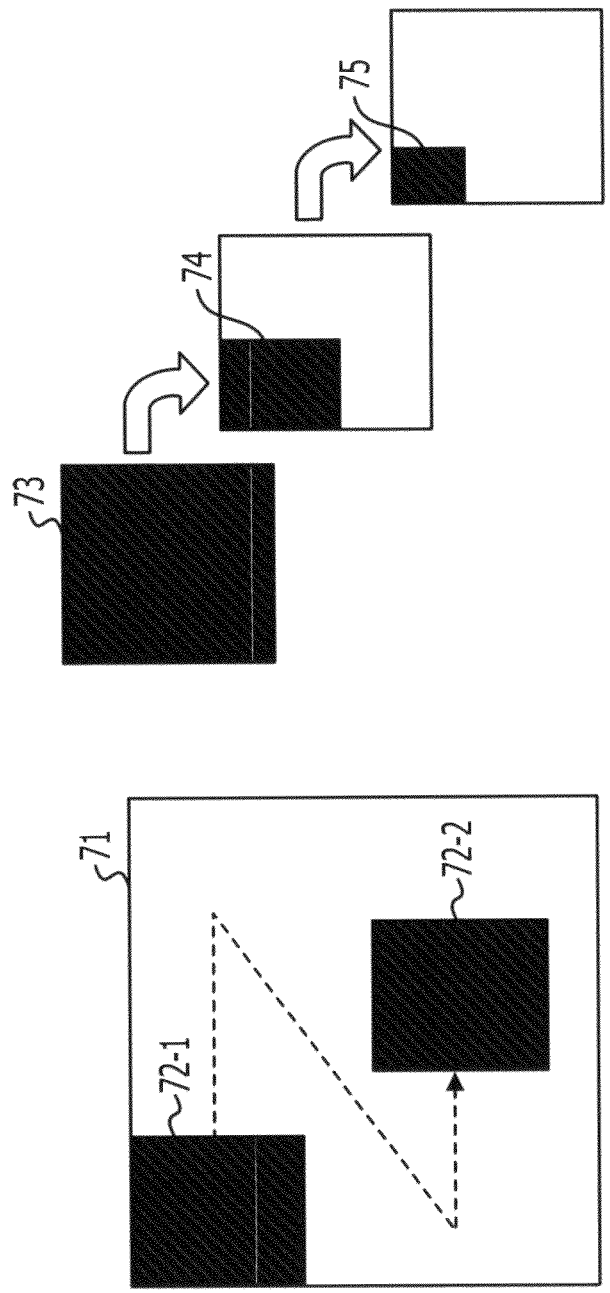
FIG. 7 describes a procedure for setting a candidate region.

The setting of the candidate areas is explained with reference to FIG. 7. FIG. 7 illustrates the procedure for setting a candidate region. The specifying unit 15 sets an area 72-1 in an image 71 processing target. The set area becomes a candidate area. The specifying unit 15 sets the area as 72-1 and 72-2 in order while sliding the image that is a processing target. The specifying unit 15 also sets various sizes of candidate areas by successively reducing the size of an area as illustrated with areas 73, 74 and 75. The entire image processing target may also be set as the candidate area at first.

As described above, the image accumulating apparatus 1 is able to specify a similar image from an obtained image. Specifically, the user of the terminal device 3 may be able to effectively confirm the consistency of the text information with regard to the similar image by confirming only an image that has a high level of similarity.

To improve the consistency of the similar image and the text information, it is possible to make the threshold for determining similarity with the reference image more severe. Specifically, this is a way to extract an image with higher reliability. Using a conventional technique, a technique may be considered to associate a retrieved similar image with metadata as-is and then store the similar image and the metadata. However, if the method of setting a suitable threshold uses a setting that is too strict or too difficult, a problem such as not retrieving a similar image may occur.

The setting of a strict threshold is not appropriate when there is a desire to collect more images associated with certain text information. Conversely, an aspect of the present embodiment allows images to be effectively collected regardless of the accuracy of similar image retrieval because the similar image and the text information are associated with each other and stored based on the instruction information.

Second Embodiment

The second embodiment describes an image accumulating method and an image accumulating apparatus that attaches text information to a plurality of images that make up a video and accumulates the images and the text information. The image accumulating apparatus of the second embodiment conducts a similar image specification procedure on several images included in a video without conducting the similar image specification procedure on all the images that make up the video. The similar image specification procedure of the second embodiment is different from that of the first embodiment.

Figure 8:
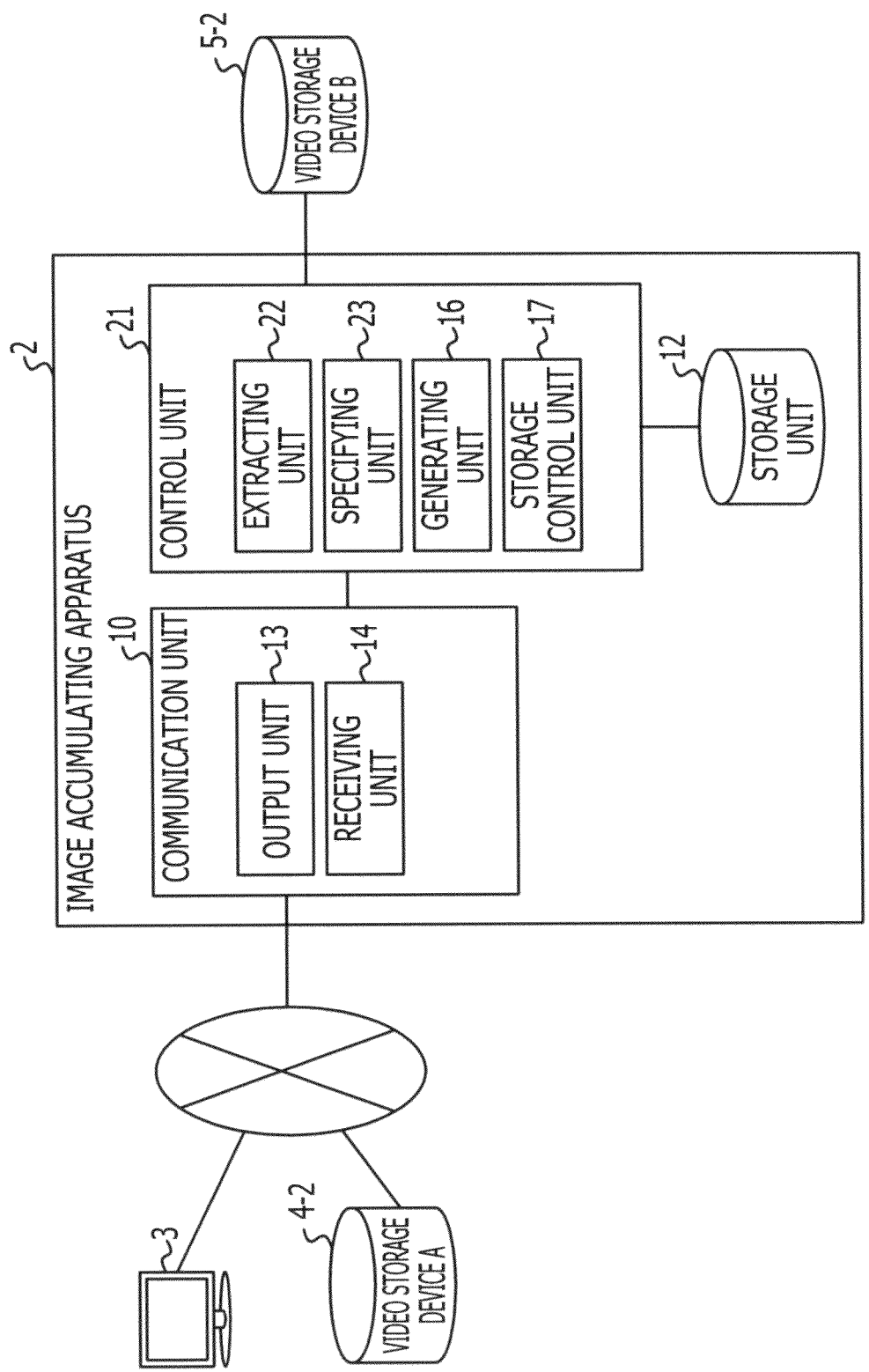
FIG. 8 is a functional block diagram of an image accumulating apparatus according to a second embodiment.

FIG. 8 is a functional block diagram of an image accumulating apparatus according to the second embodiment. An image accumulating apparatus 2 includes a communication unit 10, a control unit 21, and a storage unit 12. The communication unit 10 includes a receiving unit 14 and an output unit 13. The control unit 21 includes a generating unit 16, and a storage control unit 17. The control unit 21 also includes a specifying unit 23 that conducts a process different from that of the first embodiment, and an extracting unit 22. Processing units having functions similar to those of the first embodiment are provided with the same reference numeral. The following explanation will focus on functions different from those of the first embodiment.

The extracting unit 22 is a processing unit that extracts a representative image from a video that includes multiple images. For example, the extracting unit 22 sorts multiple images into a group of multiple images. The extracting unit 22 then extracts at least one image from each image group as a representative image.

For example, the extracting unit 22 detects a scene change in a video with a conventional technique. The extracting unit 22 then sets the images included in each scene as an image group. For each time period of a certain length, the extracting unit 22 may also generate an image group from images in the time period. The representative image is, for example, the image at the head of a scene or an image corresponding to a frame number. A frame number is a number uniquely attached to the each of multiple images that constitute a video. As each image is generated, the frame number increases so that an earlier image has a smaller frame number than a later image.

The specifying unit 23 is a processing unit for specifying a similar image. However, the specifying unit 23 specifies a similar image with a procedure that is different from that of the first embodiment. The similar image specification procedure according to the second embodiment is explained below.

Figure 9:
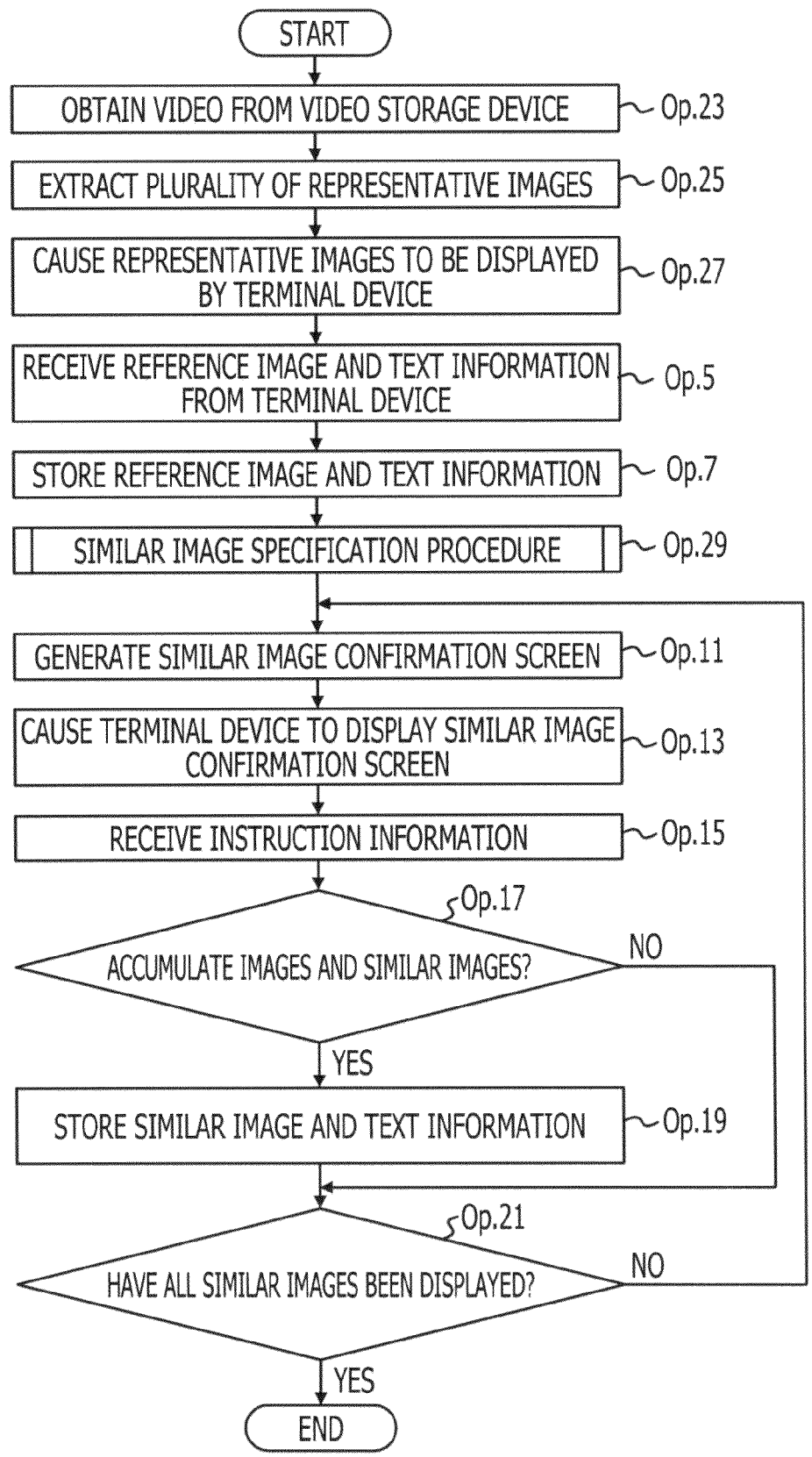
FIG. 9 is a flowchart of an image accumulating procedure according to the second embodiment.

The flow of the processing by the image accumulating apparatus 2 according to the second embodiment will be explained with reference to FIG. 9. FIG. 9 is a flowchart according to the second embodiment.

The receiving unit 14 obtains a video from a video storage device (Op. 23). A search condition for searching the video storage device may be input before Op. 23 and a video that matches the search condition may be obtained. For example, the search condition may be the video's shooting date and time.

The extracting unit 22 extracts a plurality of representative images from the multiple images that constitute the video (Op. 25). The generating unit 16 then generates screen information for the terminal device 3 to render a reference screen. The reference screen is a screen for displaying one or more representative images among the plurality of representative images. The representative images to be displayed first may be selected randomly or may be the representative image that has the lowest frame number.

By conducting the following image accumulating procedure on the extracted representative images, the image accumulating apparatus 2 is able to shorten the processing time in comparison to conducting processing on all of the images included in the video.

The output unit 13 transmits the image information to the terminal device 3 to cause the representative images to be displayed by the terminal device 3 (Op. 27). The following processing is similar to that of the first embodiment except for the contents of the similar image specification procedure (Op. 29).

Specifically, the image accumulating apparatus 2 ultimately stores the similar image and the text information associated with the reference image in association with each other in the storage unit 12 based on the instruction information. The reference image is any one of the images among the representative images, or is an image of a partial area of a representative image. The similar image is any one of the images among the multiple representative images, or is an image of a partial area of a representative image.

Specifically, the image accumulating apparatus 2 is able to effectively attach metadata to multiple images. The image accumulating apparatus 2 is also able to associate and manage the images and the metadata after the consistency of the metadata and the images is guaranteed.

Figure 10:
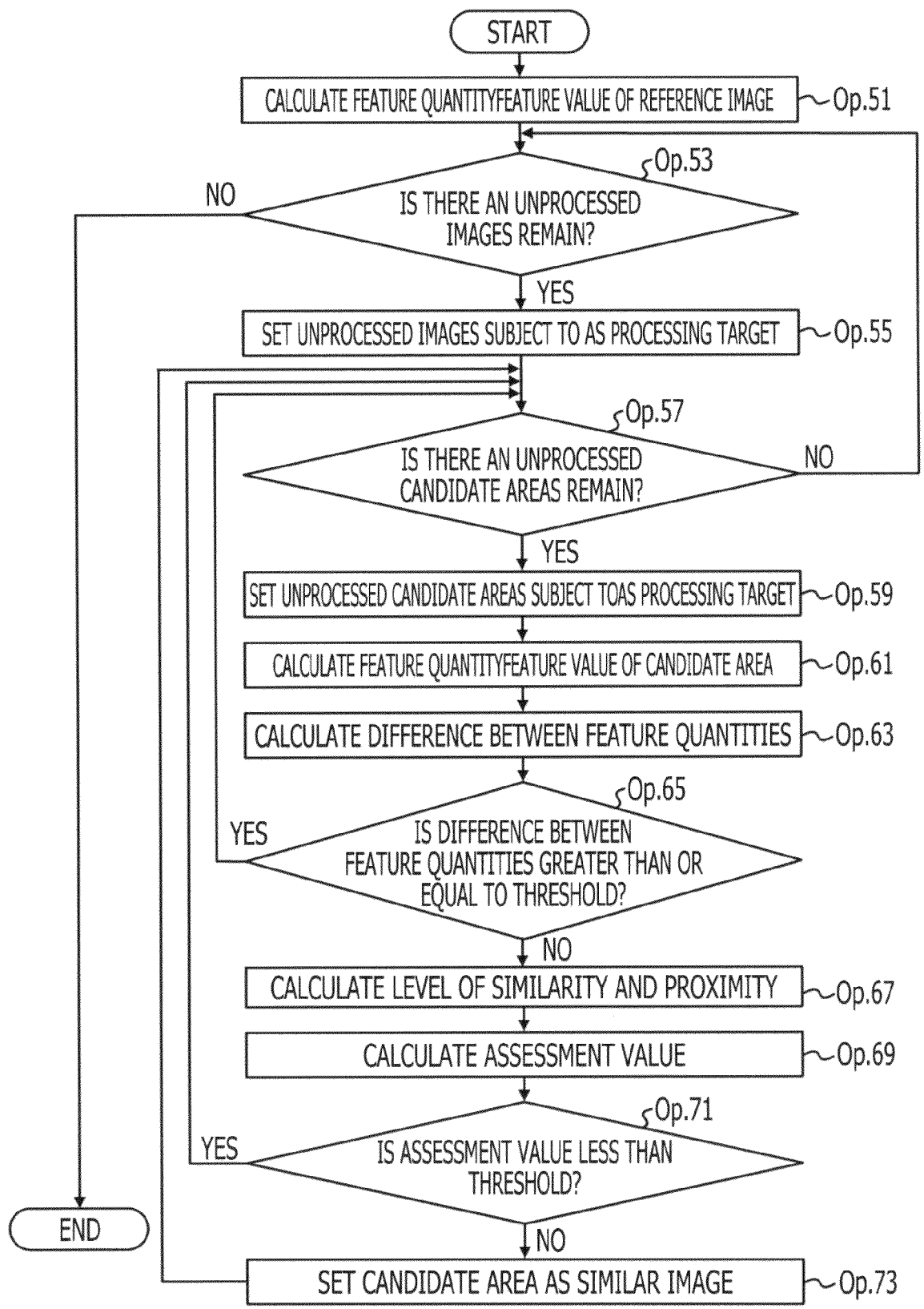
FIG. 10 is a flowchart of a similar image specification procedure according to the second embodiment.

The similar image specification procedure according to the second embodiment will be explained with reference to FIG. 10. FIG. 10 is a flowchart of the similar image specification procedure according to the second embodiment.

The specifying unit 23 calculates a feature value of the reference image received in Op. 5 (Op. 51). Next, the specifying unit 23 determines if there is an unprocessed image among the plurality of representative images obtained in Op. 25 (Op. 53).

From among the representative images set as reference images, processing may be limited to only other representative images that are within a certain number of frames. In this case, for example, whether there is an unprocessed representative image within 1000 frames from the reference image is determined. The image accumulating apparatus 2 is able to shorten the processing time in comparison to having all the images as a processing target. Specifically, when assuming that the possibility that a similar image is included is low for frames that correspond to a certain amount of time or more from the reference image frame, conducting the specification procedure for similar images that are limited to frame images with a high possibility may be effective.

When there is an unprocessed representative images (Op. 53 YES), the specifying unit 23 sets the unprocessed representative image as the processing target (Op. 55). The specifying unit 23 determines whether there is an unprocessed candidate area in the image that is the processing target (Op. 57). If there is an unprocessed candidate area (Op. 57 YES), the unprocessed candidate area becomes the processing target (Op. 59). The specifying unit 23 calculates a feature value for the reference image of the candidate area that is the processing target (Op. 61).

The specifying unit 23 calculates a difference between the feature value of the reference image and the feature value of the image in the candidate area (Op. 63). The specifying unit 23 then compares the difference to a threshold (Op. 65). If the difference is less than the threshold (Op. 65 YES), the specifying unit 23 calculates a level of similarity of the feature values between the images, and calculates a temporal proximity between the images (Op. 67).

The level of similarity is a value that indicates a degree of similarity between the features of the reference image and the features of the image that is the processing target. The level of similarity becomes larger as a difference between the feature values of the images becomes smaller. The proximity is a value that indicates the level of closeness of the time that the images are generated or shot. The proximity becomes larger as a difference between the times that the images are generated or shot is smaller.

For example, a feature value $V_i$ of a reference image is represented by expression 1 and a feature value $V_j$ of an image in the candidate area is represented by expression 2. The value k is the dimension of a vector.

$$V_i = \{V_{i1}, V_{i2}, \ldots V_{ik}\} \qquad \text{Expression 1:}$$

$$V_j\{V_{j1}, V_{j2}, \ldots V_{jk}\} \qquad \text{Expression 2:}$$

First, the level of similarity $R_{ij}$ of the feature values $V_i$ and $V_j$ is calculated based on the difference between the feature values of the images. $R_T$ is set to a value that is larger than the maximum value of expression 4, which is derived using sample data. Specifically, the level of similarity $R_{ij}$ has a value between 0 and 1.

$$R_{ij} = 1 - \left(\sum_{k=1}^{K} |V_{ik} - V_{jk}|\right) / R_T \qquad \text{Expression 3}$$

$$\sum_{k=1}^{K} |V_{ik} - V_{jk}| \qquad \text{Expression 4}$$

Next, the proximity $D_{ij}$ is calculated in expression 5 based on the difference between an elapsed time $T_i$ from the starting time of the video up to the frame that includes the reference image, and an elapsed time $T_j$ from the starting time of the video until the frame that includes the candidate area.

$D_T$ is set to a value larger than the maximum value of expression 4, which is derived using sample data. Specifically, the proximity $D_{ij}$ has a value between 0 and 1. The shooting time of each frame may be used in place of the elapsed time. Moreover, a difference between the frame number of the frame that includes the reference image and the frame number of the frame that includes the candidate area may also be calculated instead of the difference between the time of each frame.

$$D = 1 - |T_i - T_j| / D_T \qquad \text{Expression 5:}$$

$$|T_i - T_j| \qquad \text{Expression 6:}$$

Next, the specifying unit 23 calculates an assessment value (Op. 69). An assessment value $P_{ij}$ is derived using expression 7 for example. The assessment value $P_{ij}$ has a value between 0 and 1. The assessment value is a value that indicates the level of probability that the text information associated with the reference image also corresponds to the candidate area. For example, the assessment value increases as the features of the reference image and the features of the image in the candidate area become more similar. The assessment value also becomes larger as the frame that includes the reference image and the frame that includes the candidate area become closer in time.

$$P_{ij} = R_{ij} \times D_{ij} \qquad \text{Expression 7:}$$

Other elements may be considered when calculating the assessment value. The matching or non-matching of attached information may also be considered when a type of attached information is tied to each representative image. For example, information such as a scene name or a shooting location may be considered as attached information. For example, if the attached information of images matches each other, $P_{ij}$ is multiplied by 1. Conversely, if the attached information of images do not match each other, $P_{ij}$ may be multiplied by 0.5 or 0.

If the assessment value is greater than or equal to a threshold (Op. 71 YES), the image in the candidate area processing target is considered to be a similar image (Op. 73). The specifying unit 23 temporarily stores the similar image in a memory. The specifying unit 23 also stores the range information of the candidate area specified as the similar image therewith. Next, the routine of the specifying unit 23 returns to Op. 57. If the assessment value is less than the threshold (Op. 71 NO), the routine returns to Op. 57.

In Op. 57, if the specifying unit 23 determines that there are no unprocessed candidate areas (Op. 57 NO), the routine returns to Op. 53. In Op. 53, if the specifying unit 23 determines that there are no unprocessed candidate areas (Op. 53 NO), the similar image specification procedure is completed. Although an example of a procedure that compares the assessment value with a threshold to specify a similar image is described in FIG. 10, the processing is not limited to this.

For example, a process to calculate the assessment value may be conducted for a candidate area in which a difference between feature values is less than a threshold. The image accumulating apparatus 2 then may consider a candidate area, in which the assessment value is a certain high number or a certain ratio, to be the similar image.

According to the above processing, the image accumulating apparatus 2 may be able to specify a similar image using an assessment value. The similar image may be specified by considering a difference between the feature value of the reference image and the feature value of the image in the candidate area, as well as a temporal difference between the reference image and the image in the candidate area.

With video, two images in which the shooting times or the generated times are close indicate a high possibility that the same object is being shown. Thus, a similar image may be specified with accuracy by specifying the similar image through consideration of a temporal difference. Furthermore, even when there is an image that is determined to have a low similarity when a determination is made only by the difference in the feature values, a similar image may be determined if the image and the similar image are temporally close to each other. Consequently, by specifying a similar image through consideration of a temporal difference, more similar images may be associated with text information and accumulated.

The image accumulating apparatus 2 may cause, in Op. 13 in FIG. 9, the terminal device to display a group of images that includes the similar images specified by the processing in FIG. 10. Since the group of images is formed from the same scene, there is a high possibility that the similar images are similar to the reference images referred to when specifying the similar images. Specifically, by allowing the user to conduct a broad confirmation of images that may be subject to text information attachment, more images may be associated with text information and collected.

Third Embodiment

A third embodiment involves the specification of a plurality of reference areas in a certain image by a user. The third embodiment describes an image accumulating method and the image accumulating apparatus 2 that specifies a similar image, which is similar to a reference image when an image that includes a plurality of reference areas is set as the reference image. Specifically, the user operating the terminal device 3 specifies a plurality of areas in a certain reference image as a plurality of reference areas. In the third embodiment, the image accumulating procedure is conducted on a plurality of images that make up a video in the same way as the second embodiment. The functional configuration of the image accumulating apparatus 2 in the third embodiment is the same as that of the second embodiment.

Figure 11:
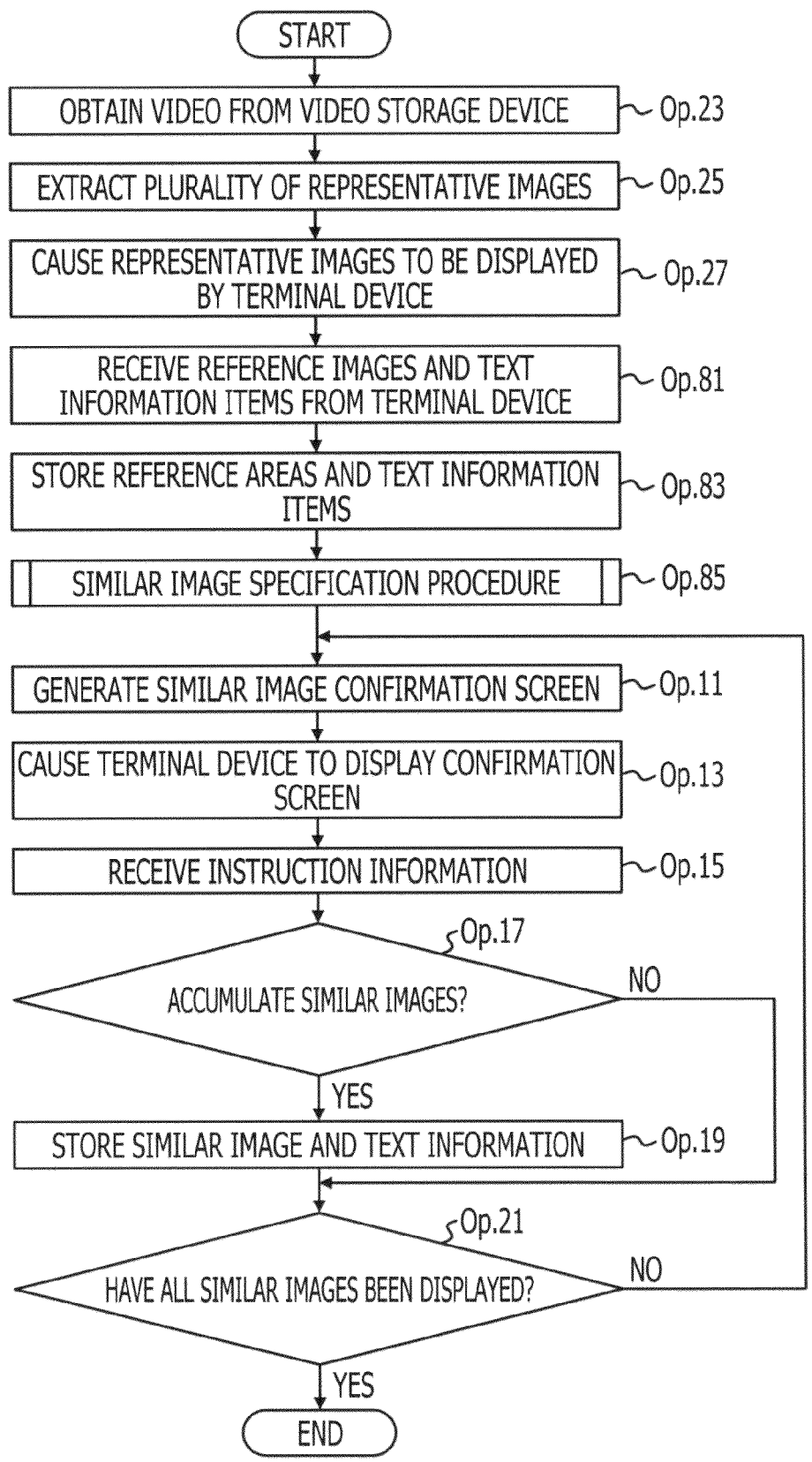
FIG. 11 is a flowchart of an image accumulating procedure according to a third embodiment.

Functional configurations are the same as those of the second embodiment. However, a portion of the generating unit 16 processing is different. Details are described hereinbelow using a flowchart of the image accumulating procedure according to the third embodiment. FIG. 11 is a flowchart of the image accumulating procedure according to the third embodiment.

The procedures in Op. 23, Op. 25, and in Op. 27 in FIG. 11 are the same as the procedures in Op. 23, Op. 25, and in Op. 27 in FIG. 9. The receiving unit 14 receives a plurality of reference areas and text information items associated with each of the reference areas (Op. 81).

Figure 12:
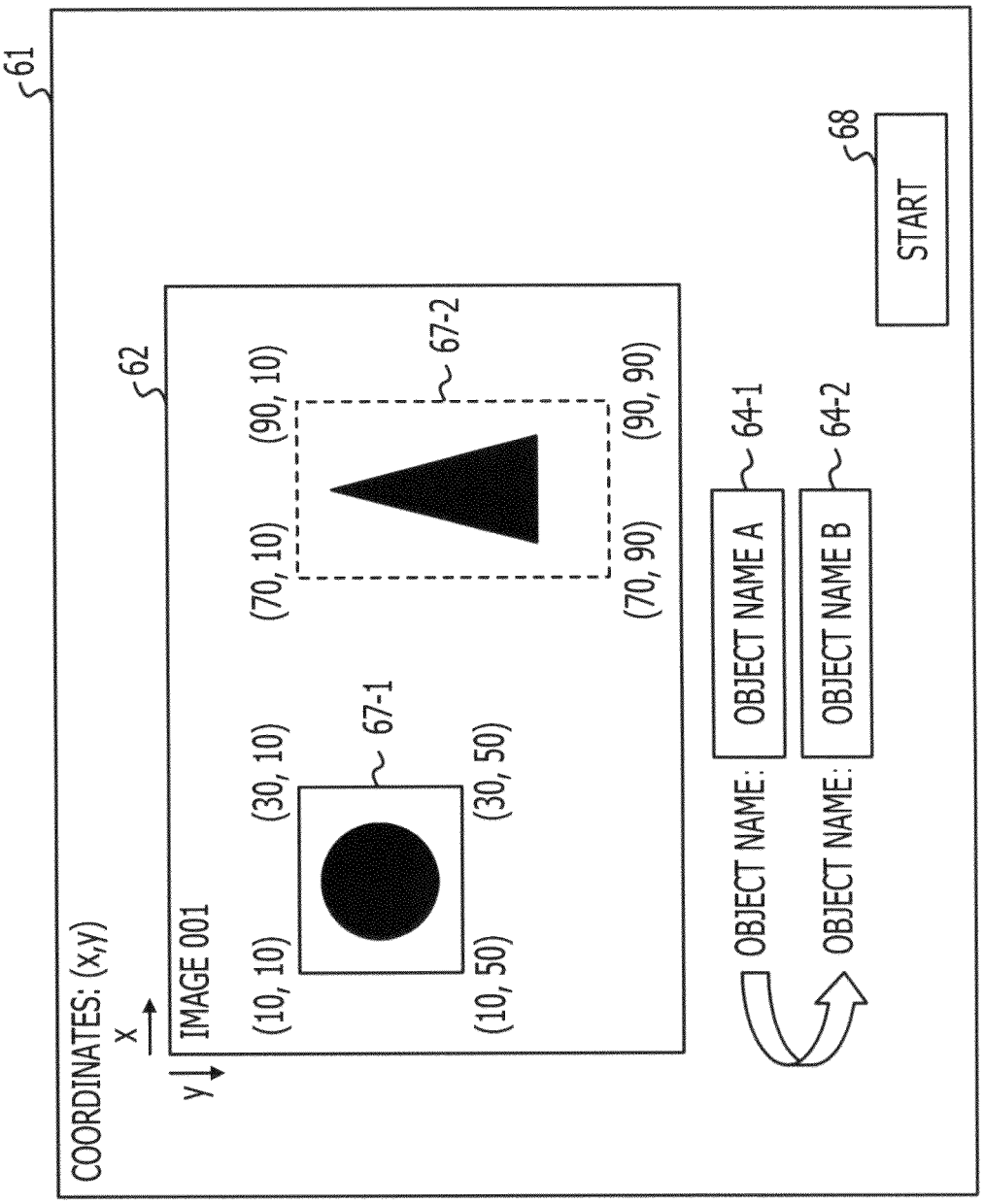
FIG. 12 is a screen image of a reference screen according to the third embodiment.

A plurality of reference images and a plurality of text information items are described with reference to FIG. 12. FIG. 12 is a representation of a reference screen displayed by the terminal device 3. The confirmation screen is rendered by the terminal device 3 based on the image information generated by the image accumulating apparatus 2 in the same way as illustrated in FIG. 4. A reference screen 61 has a display area 62, an input area 64, and a start button 68.

The reference screen 61 may also have, in the same way as FIG. 4, a display area 43 that displays support information to assist the inputting, and the operating buttons 45 and 46 that receive operations to change the displayed images.

An image obtained from the image accumulating apparatus 2 is displayed in the display area 62. At least a portion of the area of the image displayed in the display area 62 is specified by the user. For example, in the example in FIG. 12, an area 67-1 that includes a round object and an area 67-2 that includes a triangular object are specified. Specifically, image accumulating apparatus 2 is notified of the areas specified in this way as a plurality of reference areas. Furthermore, when the terminal device 3 receives an area specification from the user, the image displayed in the display area 62 is a reference image.

The input area 64 is an area in which text information corresponding to the image of the reference image is input. For example, the text information "object name A" is input in an input area 64-1 for the reference area 67-1 that includes the round object. The text information is defined by the pressing of an enter key or the like. After the text information is defined, an input area 64-2 is displayed as a blank field. When the reference area 67-2 that includes the triangular object is further specified by the user, the text information "object name B" is input into the newly displayed input area 64-2 and the reference area 67-2 is defined.

The starting button 68 is a button for receiving an instruction from the user to transmit each of the reference images and text information items to the image accumulating apparatus 2. For example, when the start button 47 is selected via the screen, the terminal device 3 transmits the image information and the text information "object name A" that is associated with the reference area 67-1, and the image information and the text information "object name B" that is associated with the reference area 67-2 to the image accumulating apparatus 2. The range information of the reference area is transmitted with the image information to the image accumulating apparatus 2.

For example, the image information "001" and the reference area 67-1 range information "(10,10) (30,10) (10,50) (30,50)" are transmitted. The range information is not limited to four coordinate points and may be represented as an X-coordinate range (from 10 to 30) and a Y-coordinate range (from 10 to 50). As described above, the plurality of reference areas are transmitted according to an instruction from the terminal device 3 to the image accumulating apparatus 2 in a state where the plurality of reference areas are associated with each text information item.

The explanation now returns to FIG. 11. The storage control unit 17 stores the reference areas and text information items in association with each other (Op. 83). For example, two records including the information of the reference area 67-1 in FIG. 12 and the information of the reference area 67-2 in FIG. 12 are added to the table in FIG. 2C. The identification information of the reference image "001" is stored in a portion of the image information in FIG. 2C.

The following processing is similar to that of the first embodiment except for the contents of the similar image specification procedure (Op. 85). Specifically, the image accumulating apparatus 2 ultimately associates the similar images and the text information items associated with the reference areas and stores the similar images and the text information items in the storage unit 12.

Specifically, the image accumulating apparatus 2 may be able to effectively attach metadata to multiple images. The image accumulating apparatus 2 may also be able to associate and manage the images and the metadata after the consistency of the metadata and the images has been guaranteed.

Figure 13A:
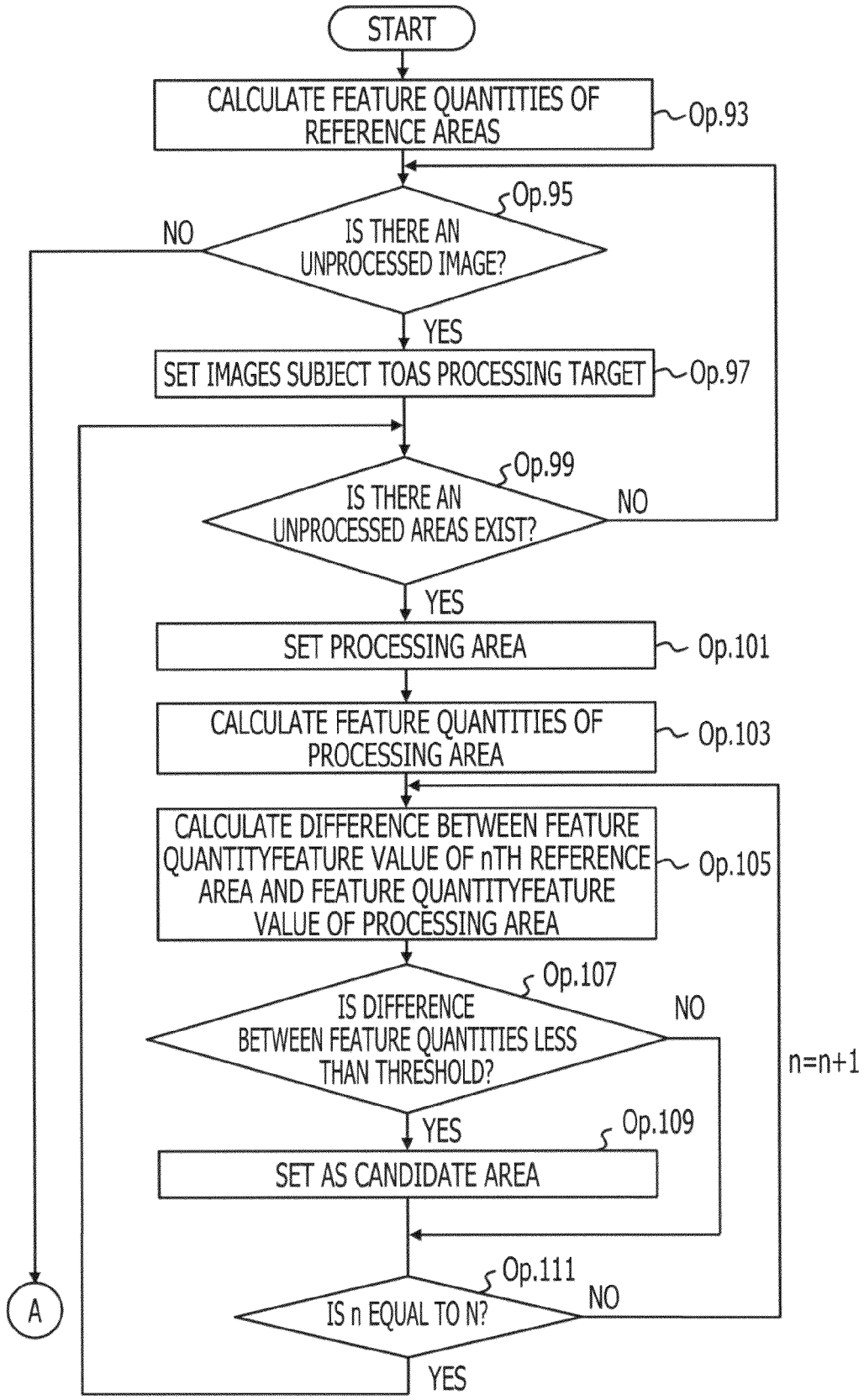
FIGS. 13A, 13B and 13C are flowcharts of a similar image specification procedure according to the third embodiment.

The similar image specification procedure (Op. 85) according to the third embodiment will be explained with reference to FIGS. 13A and 13C. FIG. 13A is a flowchart of a similar image specification procedure according to the third embodiment.

The specifying unit 23 calculates the feature value of each of the plurality of reference areas in the reference image (Op. 93). Next, the specifying unit 23 determines if there is an unprocessed representative image from the similar image specification procedure (Op. 95).

When there is an unprocessed representative image (Op. 95 YES), the specifying unit 23 sets the unprocessed representative image as a processing target (Op. 97). The specifying unit 23 determines whether there is an unprocessed area in the processing target image (Op. 99). If there is an unprocessed area (Op. 99 YES), the unprocessed area is set as a processing area (Op. 101). The specifying unit 23 calculates the feature value of the image in the processing area (Op. 103).

The specifying unit 23 calculates a difference between the feature value of the $n^{th}$ reference area and the feature value of the image in the processing area (Op. 105). The specifying unit 23 compares the difference to a threshold (Op. 107). Here, "n" is an integer from 1 to N. "N" is the number of reference areas included in the reference image. For example, N is equal to two in the example in FIG. 12.

If the difference is less than the threshold (Op. 107 YES), the specifying unit 23 sets the processing area as a candidate area (Op. 109). The image set as the candidate area is temporarily stored in a memory along with range information that indicates the candidate area.

Conversely, if the difference is greater than or equal to the threshold (Op. 107 NO), the routine advances to Op. 111. The specifying unit 23 determines whether n is equal to N (Op. 111). That n equals N indicates that the feature values of the all the reference areas have been compared with the feature value of the processing area. That n does not equal N indicates that the comparison of the feature values of the processing areas set in Op. 101 with feature values of all the reference areas has not been completed.

If n does not equal N (Op. 111 NO), the specifying unit 23 increments n by 1 and the routine returns to Op. 105. Conversely, if n does equal N (Op. 111 YES), the routine of the specifying unit 23 returns to Op. 99.

If it is determined in Op. 99 that there are no unprocessed areas (Op. 99 NO), the routine of the specifying unit 23 returns to Op. 95. If there are no unprocessed representative images (Op. 95 NO), the specifying unit 23 conducts the operation in Op. 113 in FIG. 13B.

Figure 13B:
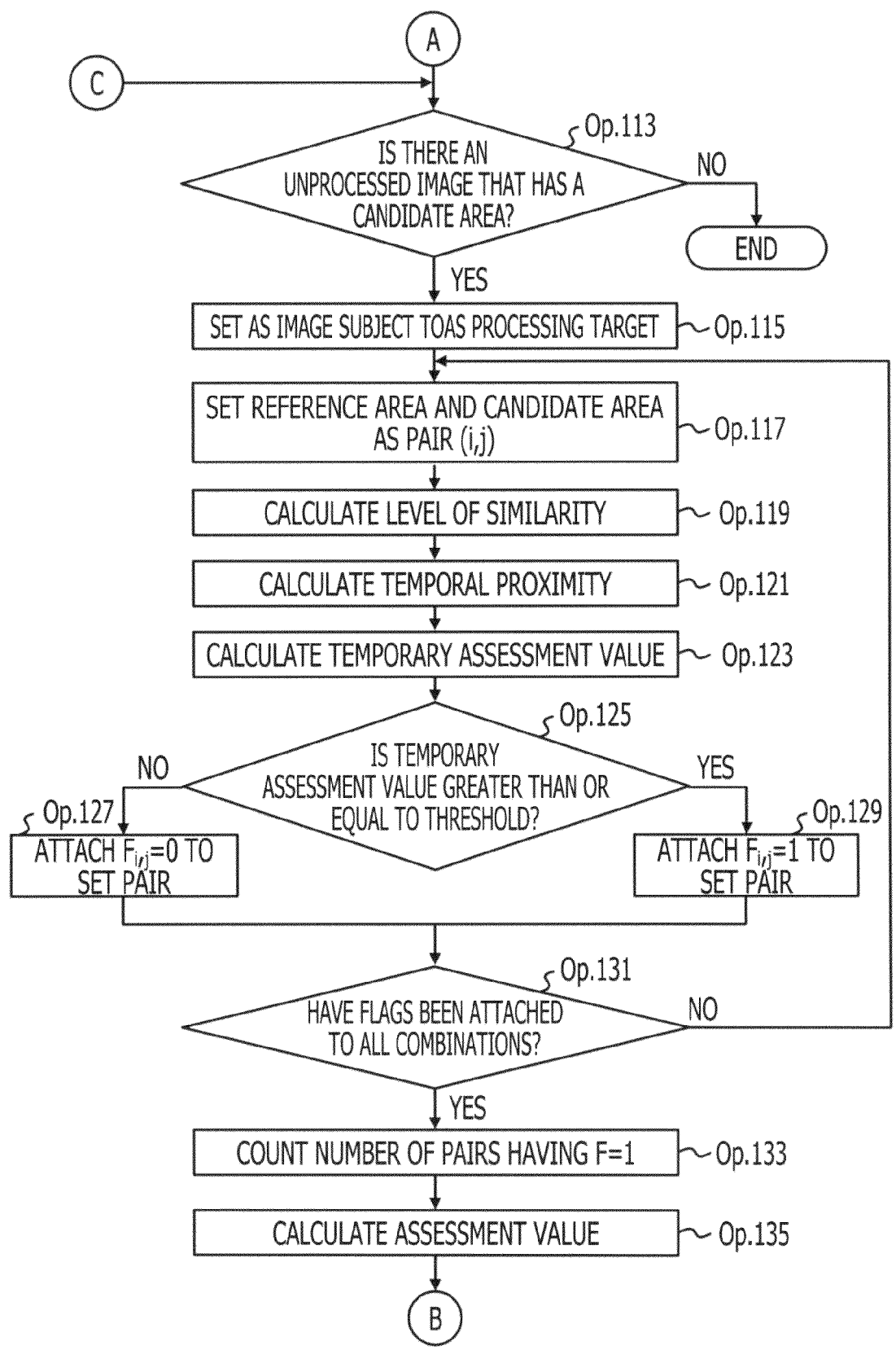

FIG. 13B is a flowchart of the similar image specification procedure according to the third embodiment.

The specifying unit 23 determines whether there is unprocessed image that has a candidate area (Op. 113). If there is an unprocessed image that has a candidate area, the specifying unit 23 sets the unprocessed image having a candidate area as an image processing target (Op. 115).

The specifying unit 23 extracts one reference area from the reference image, and extracts one candidate area from the image processing target, and sets the reference area and the candidate area as a pair (i,j) (Op. 117). The specifying unit 23 calculates the level of similarity of each of the images in the areas in the set pair (Op. 119). For example, the specifying unit 23 calculates the level of similarity using expression 3 in the same way as in the second embodiment.

The specifying unit 23 also calculates the proximity of the reference image and the image processing target for the set pair (Op. 121). For example, the specifying unit 23 calculates the proximity using the expression 6 in the same way as in the second embodiment.

Next, the specifying unit 23 calculates a temporary assessment value (Op. 123). A temporary assessment value $O_{ij}$ is derived as in expression 8 for example.

$$O_{ij} = R_{ij} \times D_{ij} \qquad \text{Expression 8:}$$

The temporary assessment value is a value that indicates the level of probability that the text information associated with the reference image corresponds to the candidate area. For example, the temporary assessment value increases as the features of the image in the reference area and the features of the image in the candidate area become more similar. The assessment value also increases when the frames that include the reference image and the candidate area become closer in time. When calculating the temporary assessment value, other elements may be considered in the same way as the assessment value calculation according to the second embodiment.

If the temporary assessment value is greater than or equal to a threshold (Op. 125 YES), the specifying unit 23 sets a flag $F_{i,j}$ to "1" (Op. 129) for the pair (i,j) set in Op. 117. If the temporary assessment value is less than a threshold (Op. 125 NO), the specifying unit 23 sets the flag $F_{i,j}$ to "0" (Op. 127) for the pair (i,j) set in Op. 117.

The specifying unit 23 determines whether a flag has been attached to all the combinations of the reference areas include in the reference image and one or more candidate areas included in the image processing target (Op. 131). If flags have not been attached to all of the combinations (Op. 131 NO), the routine returns to Op. 117.

If flags have been attached to all of the combinations (Op. 131 YES), the specifying unit 23 counts the number of area pairs that have a flag indicating "1" among the reference images and the images processing target set in Op. 115 (Op. 133). When the reference image is "α" and the image processing target is "β", the number of area pairs with the flag indicating "1" is expressed as "$N_{\alpha\beta}$".

The specifying unit 23 then calculates an assessment value between the reference image "α" and the image processing target "β" (Op. 135). The routine then advances to the processing in Op. 137 in FIG. 13C.

An assessment value $W_{\alpha\beta}$ is derived as in expression 9 for example. The assessment value $W_{\alpha\beta}$ may also be $N_{\alpha\beta}$.

$$W_{\alpha\beta} = N_{\alpha\beta} \times D_{\alpha\beta} \qquad \text{Expression 9:}$$

The assessment value $W_{\alpha\beta}$ is a value that indicates relatedness between the features of the entire reference image and the features of the entire image processing target. For example, the assessment value increases as the image processing target includes more candidate areas that have the flag indicating "1". Specifically, the assessment value increases as the image processing target has more candidate areas in which the possibility is higher that the set text information of multiple reference areas corresponds to a reference image. More detailed assessments are possible by considering a temporal proximity $D_{\alpha\beta}$ between the reference images α and the images processing target β as indicated in expression 9.

Figure 13C:
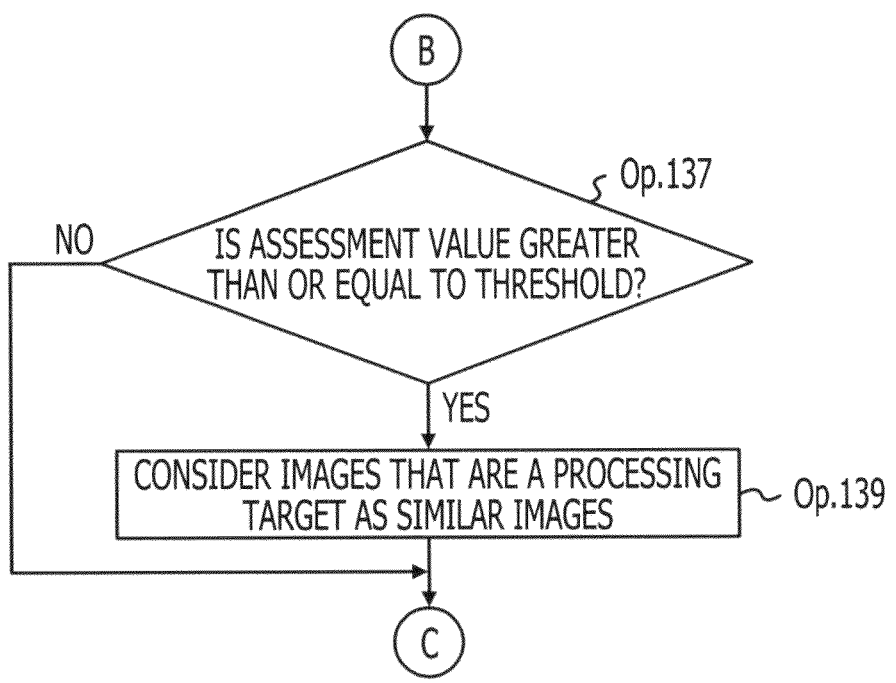

FIG. 13C is a portion of the flowchart of the similar image specification procedure according to the third embodiment.

If the assessment value is greater than or equal to the threshold (Op. 137 YES), the image processing target is considered as a similar image (Op. 139). The threshold may be appropriately changed in accordance with the number of reference areas. For example, the value may be set higher if the number of reference areas is high. The specifying unit 23 temporarily stores the similar image in a memory. The specifying unit 23 also stores the range information of the specified candidate area, which is in the similar image, therewith. Next, the routine of the specifying unit 23 returns to Op. 113. If the assessment value is less than the threshold (Op. 137 NO), the routine returns to Op. 113.

In Op. 113, if the specifying unit 23 determines that the processing from Op. 115 onwards has been conducted on all images that have candidate areas (Op. 113 NO), the similar image specification procedure is completed.

According to the above processing, reference areas set in a reference image, and a similar image that has multiple similar candidate areas may be specified. The user may effectively confirm the consistency between text information and similar images by confirming a similar image that has more candidate areas.

When conducting the similar image specification procedure in a plurality of images that make up a video, similar images may be specified by considering the temporal proximity between frames. Specifically, due to the characteristics of video, there is a high possibility that the same object and conditions are shown between images that are temporally close to each other. Thus, by considering a temporal proximity in addition to a level of similarity of image features, more similar images that are possibly associated with text information may be confirmed by a user.

Fourth Embodiment

A fourth embodiment involves controlling the display order of a plurality of images when the generating unit 16 generates a confirmation screen. The confirmation screen generating procedure in the fourth embodiment is different from that of the third embodiment. The functional configuration of the image accumulating apparatus 2 in the fourth embodiment is similar to that of the third embodiment.

FIGS. 14A and 14B describe a fourth embodiment. As illustrated in FIG. 14A, a reference area 100-1, a reference area 101-1, and a reference area 102-1 are set in a reference image a. A similar image b, a similar image c, and a similar image d are specified by the similar image specification procedure in the same way as in the third embodiment.

The generating unit 16 of the image accumulating apparatus 2 according to the fourth embodiment determines a display order of the similar images that are displayed after the reference image a. The generating unit 16 generates a confirmation screen to display the similar images in the determined display order in the procedure to generate the confirmation screen.

Figure 15:
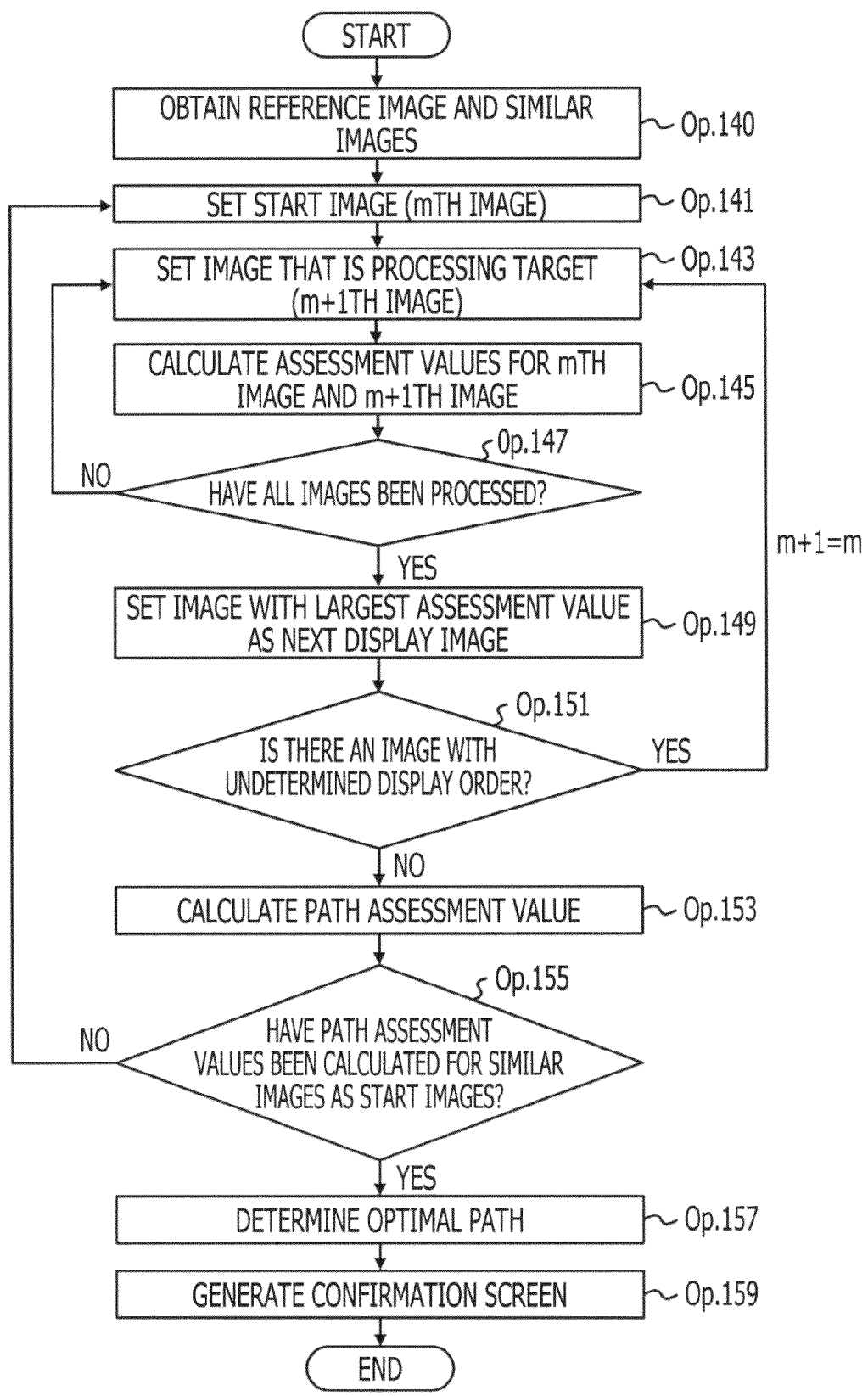
FIG. 15 is a flowchart of a confirmation screen creation procedure according to the fourth embodiment.

FIG. 15 is a flowchart of a confirmation screen generation procedure.

The generating unit 16 obtains the reference image and the similar images specified by the specifying unit 23 (Op. 140). For example, the generating unit 16 obtains the reference image a, the similar image b, the similar image c, and the similar image d.

Next, the generating unit 16 sets one of the similar images among the plurality of similar images as a start image (Op. 141). The start image is a similar image that is displayed after the reference image. For example, the generating unit 16 sets the similar image b as the start image. The start image becomes "m=1" in the display order.

Before Op. 141, the generating unit 16 may determine if there is a plurality of similar images. If there is one similar image, the following Op. 141 to Op. 157 may be omitted and the routine may advance to Op. 159.

Next, the generating unit 16 sets the image processing target that is the candidate image to be displayed as the m+1$^{th}$ image (Op. 143). For example, the generating unit 16 sets the similar image c as an image processing target. For example, the similar image c becomes "m=2" in the display order.

The generating unit 16 calculates assessment values between images following the display order (Op. 145). The assessment value is the same as that of the third embodiment. Specifically, using the processing from Op. 119 to Op. 135, the level of similarity and the proximity are derived for the m$^{th}$ image and the m+1$^{th}$ image. For example, the generating unit 16 calculates an assessment value $W_{bc}$ between the similar image b that is the first image and the similar image c that is the image processing target.

The generating unit 16 also determines whether assessment values have been calculated for the remaining similar images (Op. 147). If assessment values have not been calculated for all of the similar images, the routine returns to Op. 143. For example, if the assessment value has not been calculated for the similar image d, the routine returns to Op. 143. The generating unit 16 then sets the similar image d as an image processing target and calculates an assessment value $W_{bd}$ for the similar image b and the similar image d.

If assessment values have been calculated for all of the similar images (Op. 147 YES), the generating unit 16 sets the similar image having the largest assessment value as the m+1$^{th}$ display image to be displayed next (Op. 149). For example, if the assessment value $W_{bc}$ of the similar image b and the similar image c is larger than the assessment value $W_{bd}$ of the similar image b and the similar image d, the similar image c is set as the next display image. According to the processing up to this point, when the start image is set as the similar image b, the similar image b is displayed first and the similar image c is displayed second.

Next, the generating unit 16 determines whether there is a similar image with an undetermined display order (Op. 151). If a similar image with an undetermined display order exists (Op. 151 YES), the generating unit 16 sets the similar image set as the next display image in Op. 149 as the m$^{th}$ image, and then sets the similar image as the image processing target (Op. 143). However, when the remaining similar image is one image, the display order m+1 may be assigned to the remaining similar image.

For example, the determination in Op. 151 would be "NO" because the similar image d is present in the example displayed in FIG. 14A. Consequently, the similar image to be displayed following the similar image c that was set as the next display image in Op. 149 is determined in Op. 143 to Op. 149. In the case of FIG. 14A, the similar image d is set as the image processing target (Op. 143).

Next, the assessment value $W_{cd}$ is calculated (Op. 145). When all the similar images are processed (Op. 147 YES), the generating unit 16 sets the similar image d as the next display image (Op. 149).

If there are no similar images in which the display order is not yet determined (Op. 151 NO), the generating unit 16 calculates a path assessment value for the start image set in Op. 141 (Op. 153). The path assessment value is a value that increases as the similarity increases between images that are adjacent to each other in the display order. Specifically, the path assessment value is a value that indicates the level of similarity between images that are displayed in succession.

The path assessment value is derived in expression 10 for example. In expression 10, "A" indicates the reference image, "B" indicates the start image, and $X_1$ to $X_N$ indicate similar images other than the start image. For example, $W_{X_1 X_2}$ indicates the assessment value of the similar image $X_1$ set as the third display image and the similar image $X_2$ set as the fourth display image.

$$Z_B = W_{AB} + W_{BK_1} + W_{X_1 X_2} + \ldots W_{X_{N-1} X_N}$$ Expression 10:

For example, in the processing from Op. 141 to Op. 151, if a path with the start image set as the similar image b in FIG. 14A is determined as "b" "c" "d", the assessment value of the start image b is expressed as "$W_b = W_{ab} + W_{bc} + W_{cd}$".

Next, the generating unit 16 determines whether the path assessment values have been calculated for all the similar images that were obtained as start images in Op. 140 (Op. 155). If the path assessment values have not been calculated for all of the similar images (Op. 155 NO), the routine returns to Op. 141. For example, because the path assessment values have not been calculated for the similar image c and the similar image d in the case of FIG. 14A, the determination in Op. 155 is "NO".

Conversely, if the path assessment values have been calculated for all the similar images (Op. 155 YES), the generating unit 16 determines that the display order with the maximum path assessment value is the optimal path (Op. 157). The generating unit 16 generates a confirmation screen to display the similar images in the order determined as the optimal path (Op. 159).

An explanation of the optimal path will be provided with reference to FIG. 14B. The image area 100-1, the image area 100-2, and the image area 100-3 are areas that have image features that are similar to each other. The image area 100-1, the image area 100-2, and the image area 100-3 as areas that have the flag 1 set with respect to each other in Op. 129.

Similarly, the image area 101-1, the image area 101-2, and the image area 101-3 are areas that have image features similar to each other. The image area 102-1 and the image area 102-2 are areas that have similar image features.

The reference image a, the similar image b, the similar image c, and the similar image d are assumed to be images shot in the order of the reference image a, the similar image b, the similar image c, and the similar image d. The reference image a, the similar image b, the similar image c, and the similar image d are assumed to have a time interval of one second between the images in the order of shooting. The proximity between two images is calculated in expression 5 with $D_T=5$. In expression 5, i is the $m^{th}$ image and j is the $m+1^{th}$ image.

A path 103 in which the similar image b is set as the start image will be explained as an example. First, the assessment value $W_{ab}$ of the reference image a and the similar image b is considered as a product of the number "2" of combinations of areas with the flag set to "1", and the proximity "1⅕".

The reason that the proximity is expressed as "1⅕" is because there is a one second interval between the reference image a and the similar image b as described above. Furthermore, the assessment value $W_{bc}$ of the similar image b and the similar image c is considered to be the product of the number "1" and the proximity "1⅕". The assessment value $W_{cd}$ of the similar image c and the similar image d is considered to be the product of the number of similar regions "0" and the proximity "1⅕". As explained above, the path assessment value of the path 103 becomes "1⅖".

The path assessment value of a different path when the start image is set as the similar image b is indicated by 104 in FIG. 14B. In the flow illustrated in FIG. 15, the generating unit 16 sets the similar image having the largest assessment value as the next display image in Op. 149. Consequently, in the embodiment illustrated in FIG. 15, the path assessment value is not calculated for 104 in FIG. 14B. However, instead of the flow procedure in FIG. 15, the path assessment value may be calculated for all paths and ultimately the path having the largest path assessment value may be determined as the optimal path.

When the start image is set to the similar image c or the similar image d, the path assessment value is calculated in the same way. In the example illustrated in FIG. 14B, the path 105, which has the largest path assessment value, is adopted as the optimal path.

As described above, by determining the optimal path display order, the similar images may be displayed on the terminal device in an order in which the similarity between images is likely to be high. Therefore, the image accumulating apparatus 2 of the present embodiment is able to reduce the load of the user inputting the suitability of a similar image with respect to the text information.

For example, the user confirms the suitability of the text information with respect to other similar images after confirming the suitability of the text information with respect to a certain similar image. If the other similar images have areas with a high probability that an object that is the same as the similar image is displayed, the user may efficiently confirm the suitability of the text information. In particular, when confirming the suitability of a plurality of text information items with respect to a similar image having similar areas similar to a plurality of reference areas, the user may more effectively perform a confirmation operation due to the continuous display of similar images in which areas similar to each of the reference areas overlap.

Fifth Embodiment

Figure 16:
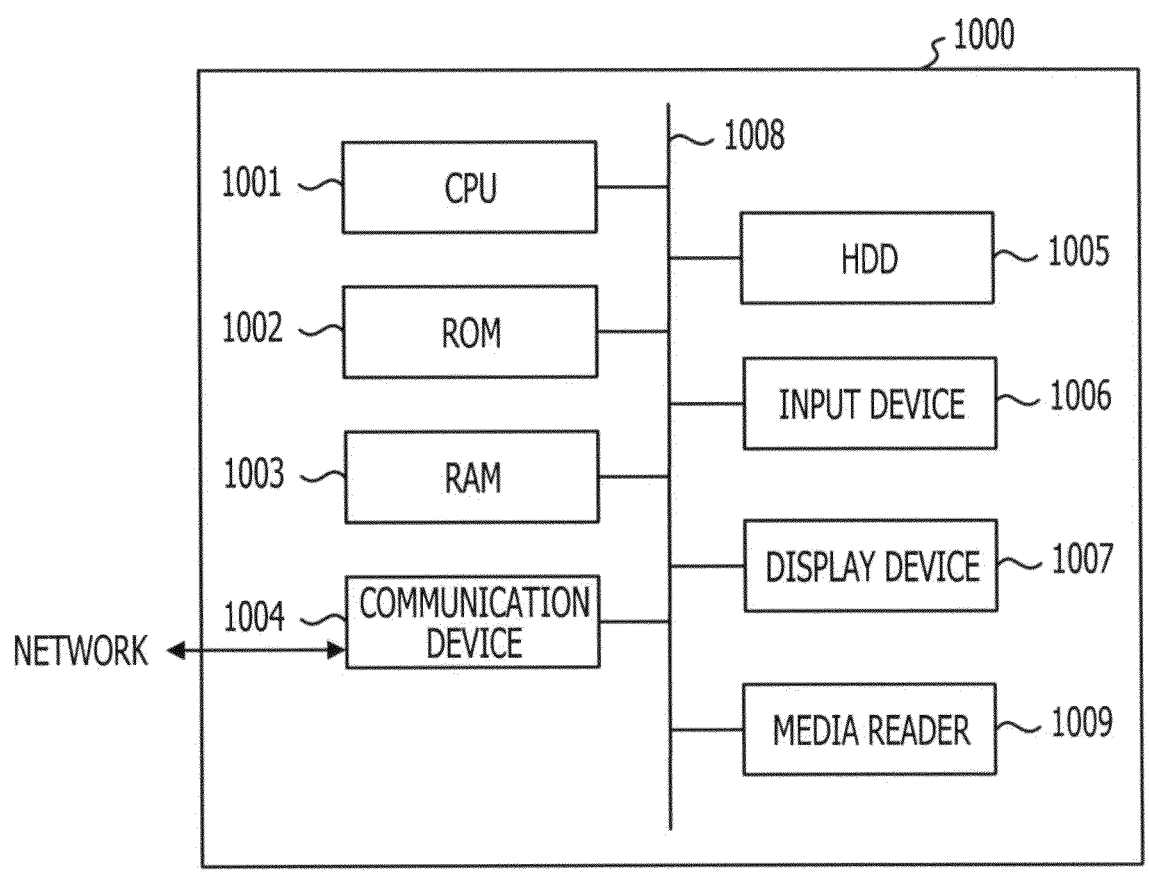
FIG. 16 describes a hardware configuration of an image accumulating apparatus.

FIG. 16 is an example of a hardware configuration of an image accumulating apparatus 1000. The image accumulating apparatus illustrated in FIG. 16 is a computer that conducts processing similar to the image accumulating apparatuses described in the first to the fourth embodiments. The computer 1000 includes a central processing unit (CPU) 1001, a read-only memory (ROM) 1002, a random-access memory (RAM) 1003, a communication device 1004, a hard disk drive (HDD) 1005, an input device 1006, a display device 1007, and a media reader 1009, all of which are interconnected by a bus 1008. Data may be mutually transmitted and received under the control of the CPU 1001.

An image accumulating program that describes the image accumulating procedure illustrated by the flowcharts in the embodiments is recorded on a computer-readable recording medium. Computer-readable recording media include, for example, a magnetic storage device, an optical disk, a magneto-optic recording medium, a semiconductor memory and the like. The magnetic recording device may be a HDD, a floppy disk (FDD), a magnetic tape (MT) or the like.

The optical disk may be a digital versatile disc (DVD), a DVD-RAM, a compact disc-read only memory (CD-ROM), or recordable/re-writable CD (CD-R/RW). The magneto-optic recording medium may be a magneto-optical disk (MO). When the programs are distributed, the programs may be sold, for example, as programs recorded on a portable recording medium such as a DVD or a CD-ROM and the like.

The media reader 1009, for example, of the computer 1000 that executes the image accumulating program reads the program from the recording medium on which the image accumulating program is recorded. According to the read program, the computer 1000 functions as the image accumulating apparatus of the first to fourth embodiments. The CPU 1001 stores the read program in the HDD 1005, or in the RAM 1002.

The CPU 1001 is a central processing device that controls all the operations of the image accumulating apparatus. The communication device 1004 receives signals from the terminal device 3 and the like through a network and transfers the contents of the signals to the CPU 1001. The communication device 1004 also transmits signals to the terminal device 3 through the network in response to instructions from the CPU 1001.

A program that causes the computer to execute the procedures of the embodiments is stored in the HDD 1005 as a program to cause the computer to demonstrate functions similar to the image accumulating apparatus described in the above embodiments.

The CPU 1001 functions as the communication unit 10 and the control unit 11 illustrated in FIG. 1 by reading, from the HDD 1005, the image accumulating program according to the first embodiment and executing the image accumulating program. The CPU 1001 functions as the communication unit 10 and the control unit 21 illustrated in FIG. 8 by reading, from the HDD 1005, the image accumulating program according to the second to fourth embodiments and executing the image accumulating program. The image accumulating program may be stored in the ROM 1002 or the RAM 1003, which are accessible by the CPU 1001.

Information corresponding to any of the storage unit data tables illustrated in FIGS. 2A to 2C is stored in the HDD 1005 under the control of the CPU 1001. Similar to the program, the information corresponding to storage unit data tables may be stored in the RAM 1003, which are accessible by the CPU 1001. Specifically, the storage unit data tables are stored in the HD 1005, or a storage device such as the RAM 1003. The input device 1006 receives inputs of data under the control of the CPU 1001. The display device 1007 outputs various types of information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute an image accumulating procedure, the image accumulating procedure comprising:
   specifying a plurality of second images similar to a first image that is associated with text information;
   displaying a plurality of individual interface screens each including one of the plurality of second images in an identifiable manner, and the text information; and
   storing the text information associated with image information that is related to each of the plurality of second images, based on instruction information that instructs a use of the text information with respect to each of the plurality of second images, wherein
   the specifying comprises:
      calculating a first feature value of the first image,
      calculating a second feature value of a candidate image in a video that includes the first image,
      calculating an assessment value based on a difference between the first feature value and the second feature value, and a difference between a time in which the first image in the video is obtained and a time in which the candidate image is obtained, and
      specifying the plurality of second images similar to the first image from candidate images based on the assessment value.

2. The non-transitory computer-readable recording medium according to claim 1, wherein
   the image accumulating procedure further comprises:
      receiving a plurality of areas included in a third image before the specifying of the plurality of second images, and
      the calculating of the assessment value calculates the assessment value in accordance with a number of areas in the candidate images that are similar to each of the plurality of areas.

3. The non-transitory computer-readable recording medium according to claim 1, wherein
   the image accumulating procedure further comprises:
      grouping a plurality of images included in the video into a plurality of image groups, and
      the specifying extracts the candidate images from each of the plurality of image groups and specifies the plurality of second images that is similar to the first image among the candidate images.

4. The non-transitory computer-readable recording medium according to claim 3, wherein
   the grouping groups the plurality of images included in the video into the plurality of image groups for each scene based on a scene change in the video, and
   the image accumulating procedure further comprises:
      displaying another image included in an image group that contains the plurality of second images after the storing.

5. The non-transitory computer-readable recording medium according to claim 1, wherein the specifying specifies the plurality of second images that is the candidate image having the assessment value not less than a threshold.

6. The non-transitory computer-readable recording medium according to claim 1, wherein
   when each of the plurality of second images is an image in an area portion of a fourth image, the displaying displays an area of the plurality of second images to be displayed as an identifiable shape on the fourth image.

7. The non-transitory computer-readable recording medium according to claim 1, wherein the image accumulating procedure further comprises:
   determining a display order of the plurality of second images.

8. An image accumulating method to be executed by a computer, the image accumulating method comprising:
   specifying a plurality of second images similar to a first image that is associated with text information;
   displaying a plurality of individual interface screens each including one of the plurality of second images in an identifiable manner, and the text information; and
   storing the text information associated with image information that is related to each of the plurality of second images, based on instruction information that instructs a use of the text information with respect to each of the plurality of second images, wherein
   the specifying comprises:
      calculating a first feature value of the first image,
      calculating a second feature value of a candidate image in a video that includes the first image,
      calculating an assessment value based on a difference between the first feature value and the second feature value, and a difference between a time in which the first image in the video is obtained and a time in which the candidate image is obtained, and
      specifying the plurality of second images similar to the first image from candidate images based on the assessment value.

9. The image accumulating method according to claim 8, further comprising:
   receiving a plurality of areas included in a third image before the specifying the plurality of second images, wherein
   the calculating of the assessment value calculates the assessment value in accordance with a number of areas in the candidate images that are similar to each of the plurality of areas.

10. The image accumulating method according to claim 8, further comprising:
    grouping a plurality of images included in the video into a plurality of image groups, wherein the specifying extracts the candidate images from each of the plurality of image groups and specifies the plurality of second images that is similar to the first image among the candidate images.

11. An image accumulating apparatus comprising:
a memory that stores a program including a procedure; and
a processor that executes the program, the procedure comprising:
specifying a plurality of second images similar to a first image that is associated with text information,
displaying a plurality of individual interface screens each including one of the plurality of second images in an identifiable manner, and the text information, and
storing the text information associated with image information that is related to each of the plurality of second images, based on instruction information that instructs a use of the text information with respect to each of the plurality of second images, wherein
the specifying comprises:
calculating a first feature value of the first image,
calculating a second feature value of a candidate image in a video that includes the first image,
calculating an assessment value based on a difference between the first feature value and the second feature value, and a difference between a time in which the first image in the video is obtained and a time in which the candidate image is obtained, and
specifying the plurality of second images similar to the first image from candidate images based on the assessment value.

12. The image accumulating apparatus according to claim 11, wherein the procedure further comprises:
receiving a plurality of areas included in a third image before the specifying the plurality of second images, wherein
the calculating of the assessment value calculates the assessment value in accordance with a number of areas in the candidate images that are similar to each of the plurality of areas.

13. The image accumulating apparatus according to claim 11, wherein
the procedure further comprises:
grouping a plurality of images included in the video into a plurality of image groups; and
the specifying extracts the candidate images from each of the plurality of image groups and specifies the plurality of second images that is similar to the first image among the candidate images.

14. The image accumulating apparatus according to claim 13, wherein
the grouping groups the plurality of images included in the video into the plurality of image groups for each scene based on a scene change in the video, and
the procedure further comprises:
displaying another image included in the image group that contains the plurality of second images after the storing.

15. A non-transitory computer-readable recording medium storing a program for causing a computer to execute an image accumulating procedure, the image accumulating procedure comprising:
specifying a plurality of second images similar to a first image that is associated with text information;
displaying a plurality of individual interface screens each including one of the plurality of second images in an identifiable manner, and the text information; and
storing the text information associated with image information that is related to each of the plurality of second images, based on instruction information that instructs a use of the text information with respect to each of the plurality of second images, wherein
the specifying includes:
obtaining a plurality of areas included in a third image from among a plurality of video images, each of the plurality of areas being obtained as one of a plurality of first images;
calculating first feature values for the plurality of the first images;
obtaining a candidate image from among the plurality of video images, the candidate image including a plurality of areas;
calculating second feature values for the plurality of the areas included in the candidate image;
calculating assessment values based on the first feature values and the second feature values; and
specifying the plurality of second images similar to the first image from candidate images based on the assessment values in accordance with a number of areas in the candidate images that are similar to each of the plurality of the first images.

16. The image accumulating method according to claim 8, wherein the specifying includes:
obtaining a plurality of areas included in a third image from among a plurality of video images, each of the plurality of areas being obtained as one of a plurality of first images;
calculating first feature values for the plurality of the first images;
obtaining a candidate image from among the plurality of video images, the candidate image including a plurality of areas;
calculating second feature values for the plurality of the areas included in the candidate image;
calculating assessment values based on the first feature values and the second feature values; and
specifying the plurality of second images similar to the first image from a plurality of the candidate images based on the assessment values in accordance with a number of areas in the candidate images that are similar to each of the plurality of the first images.

17. The image accumulating apparatus according to claim 11, wherein the specifying includes:
obtaining a plurality of areas included in a third image from among a plurality of video images, each of the plurality of areas being obtained as one of a plurality of first images;
calculating first feature values for the plurality of the first images;
obtaining a candidate image from among the plurality of video images, the candidate image including a plurality of areas;
calculating second feature values for the plurality of the areas included in the candidate image;
calculating assessment values based on the first feature values and the second feature values; and
specifying the plurality of second images similar to the first image from a plurality of the candidate images based on the assessment values in accordance with a number of areas in the candidate images that are similar to each of the plurality of the first images.

* * * * *